United States Patent [19]
Sato et al.

[11] Patent Number: 5,396,766
[45] Date of Patent: Mar. 14, 1995

[54] ABNORMALITY-DETECTING DEVICE FOR INTERNAL COMBUSTION ENGINES

[75] Inventors: Toshihiko Sato; Yoichi Iwata; Hiroshi Ito; Tsuyoshi Takizawa, all of Wako; Takayoshi Nakayama, Tochigi, all of Japan

[73] Assignee: Honda Giken Kogyo Kabushiki Kaisha, Tokyo, Japan

[21] Appl. No.: 98,798

[22] Filed: Jul. 29, 1993

[30] Foreign Application Priority Data

Jul. 31, 1992 [JP] Japan .................. 4-225285

[51] Int. Cl.⁶ .............................. F01N 3/20
[52] U.S. Cl. ........................ 60/276; 60/277
[58] Field of Search ............... 60/274, 276, 277

[56] References Cited

U.S. PATENT DOCUMENTS 5,018,348  5/1991  Durschmidt .................. 60/277
5,069,035  12/1991  Kayanuma .................. 60/277

FOREIGN PATENT DOCUMENTS 4-72438  3/1992  Japan .

Primary Examiner—Douglas Hart
Attorney, Agent, or Firm—Nikaido, Marmelstein, Murray & Oram

[57] ABSTRACT

An abnormality-detecting device is provided for an internal combustion engine having first and second oxygen sensors arranged in the exhaust system at locations upstream and downstream of a catalytic converter. An ECU detects the degree of deterioration of the catalytic converter, based on an output from the second oxygen sensor, and sets a reference value for determining an abnormality in the engine, based on the detected degree of deterioration of the catalytic converter. The ECU compares between the set reference value and a value based on an output from the first oxygen sensor, and determines the abnormality in the engine, based on the result of the comparison. Upon detection of the abnormality, an LED is actuated to issue an alarm.

8 Claims, 15 Drawing Sheets

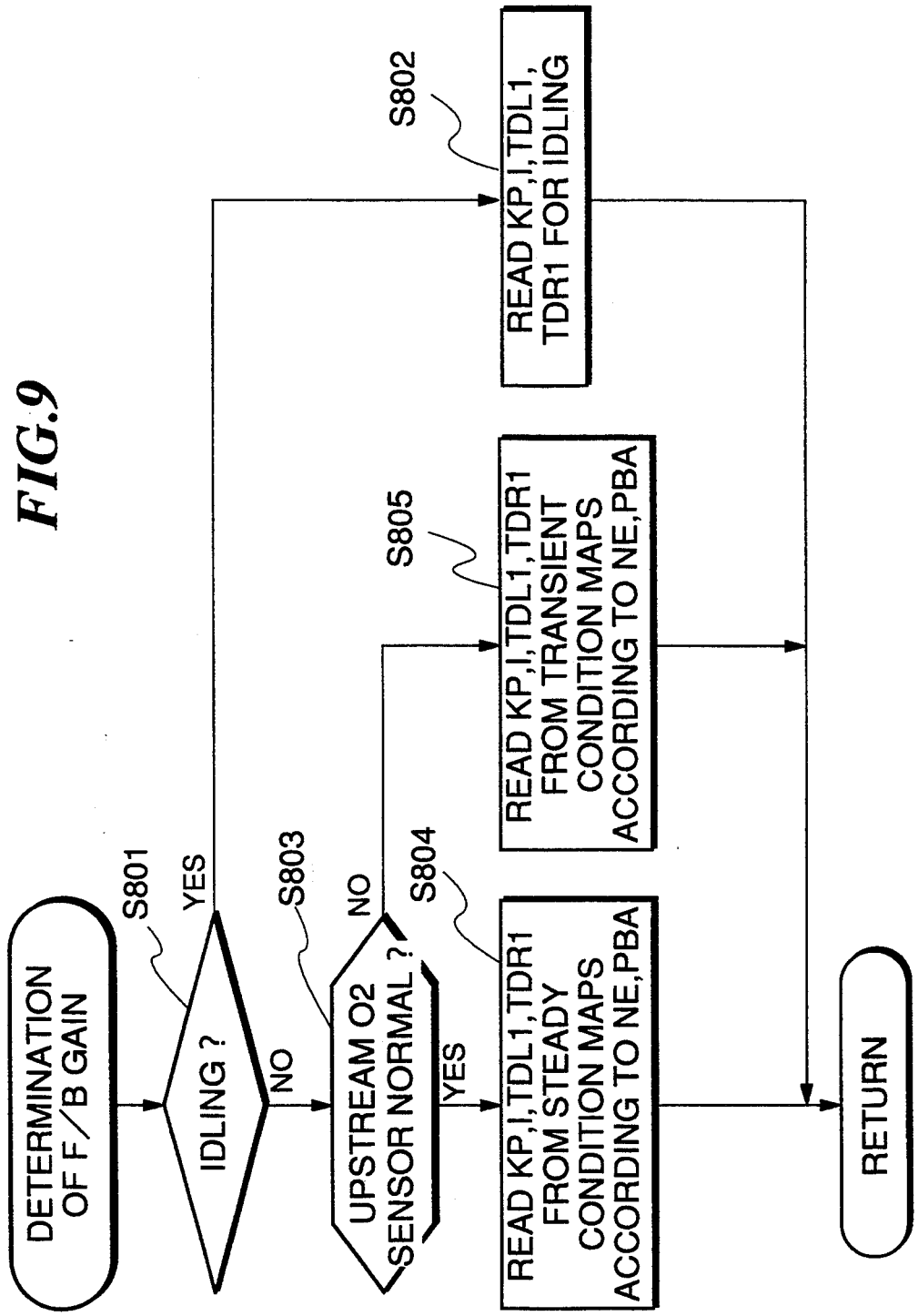

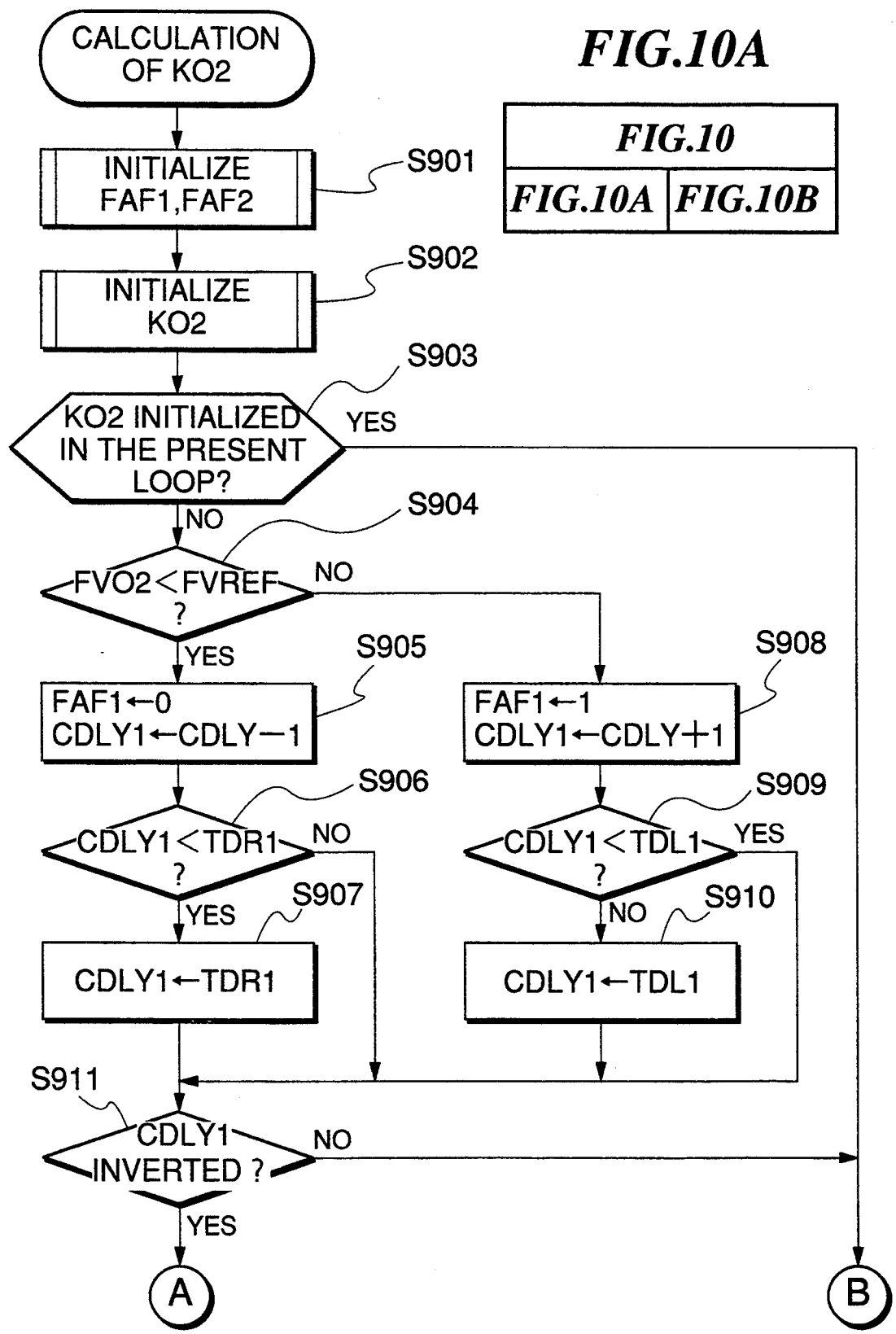

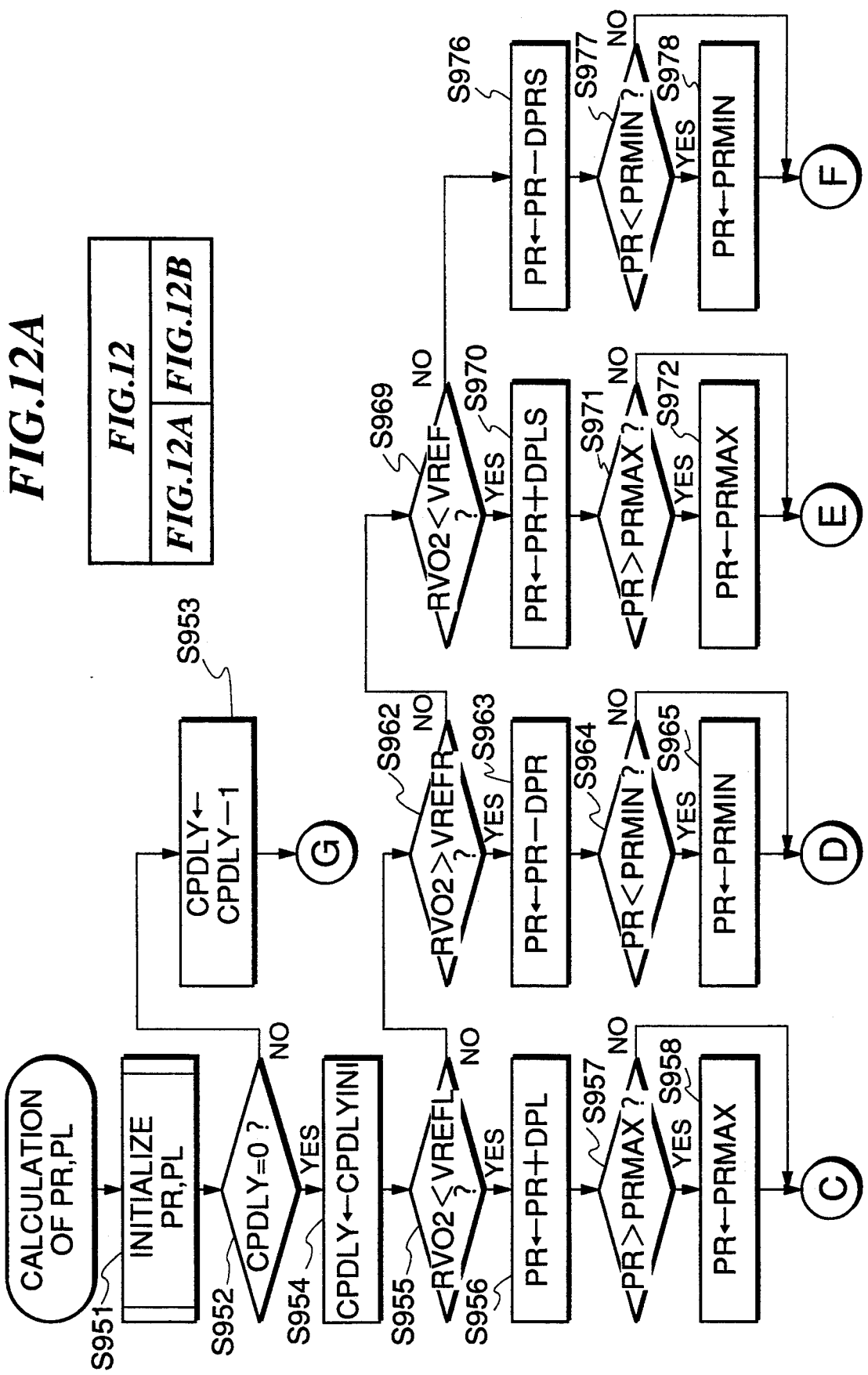

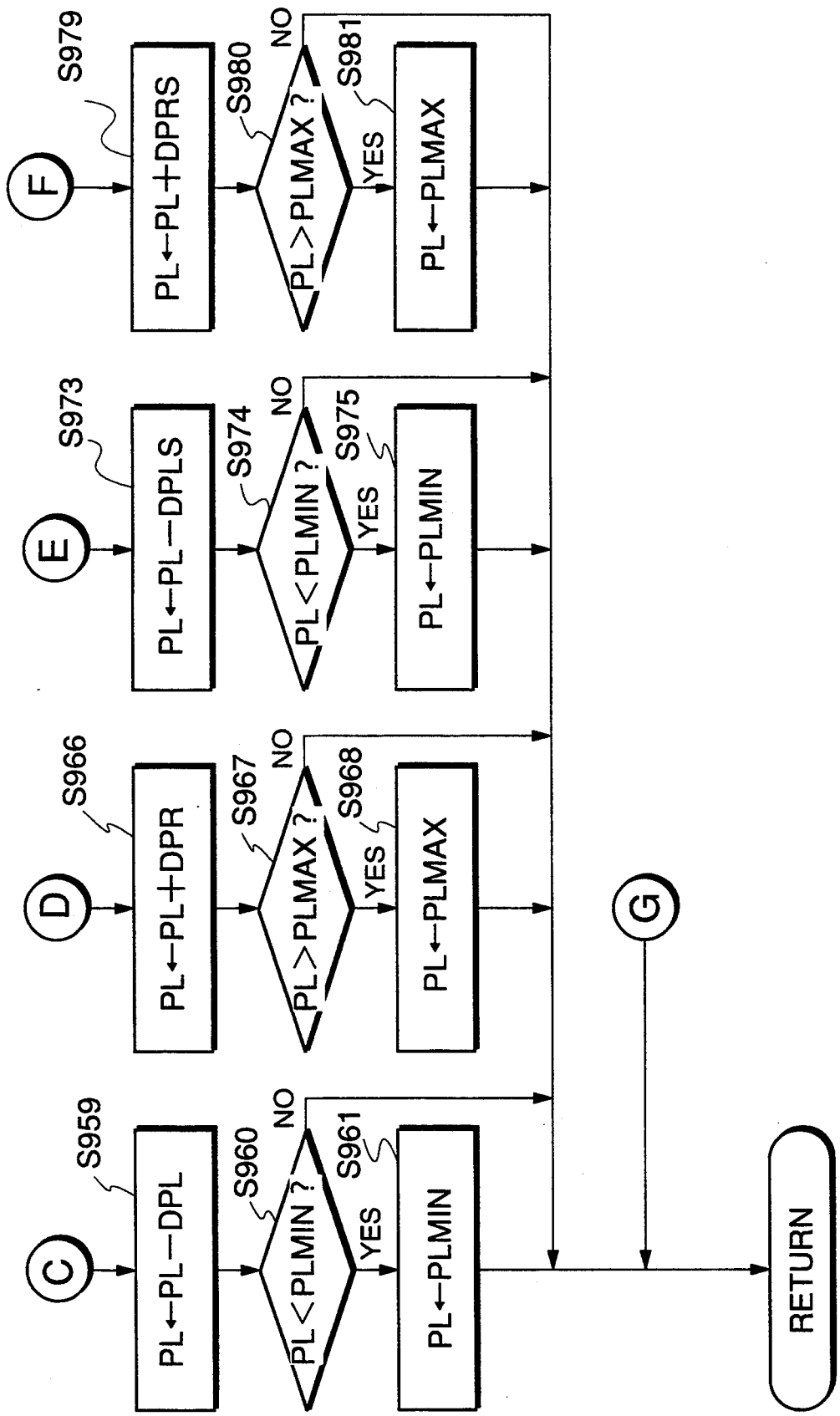

ABNORMALITY-DETECTING DEVICE FOR INTERNAL COMBUSTION ENGINES

BACKGROUND OF THE INVENTION

1. Field of the Invention

This invention relates to an abnormality-detecting device for an internal combustion engine having oxygen sensors provided in the exhaust system for detecting oxygen concentration in exhaust gases at respective locations upstream and downstream of a catalytic converter in the exhaust system.

2. Prior Art

In general, the air-fuel ratio of an air-fuel mixture supplied to an internal combustion engine is controlled in response to the concentration of oxygen in exhaust gases from the engine detected by an oxygen sensor (hereinafter referred to as the "O2 sensor") which is provided in the exhaust system at a location upstream of a catalytic converter therein, such that the air-fuel ratio of the mixture becomes equal to a desired value.

The O2 sensor is liable to change in characteristics (internal resistance, electromotive force, and response time), due to its deterioration caused by heat and the like. The use of an O2 sensor which is deteriorated in characteristics, adversely affects the accuracy of air-fuel ratio control.

To overcome this inconvenience, various proposals have been made, which include additionally providing an O2 sensor in the exhaust system at a location downstream of a catalytic converter in the exhaust system, in order to compensate for undesirable changes in characteristics of the air-fuel ratio feedback control performed in response to an output from the O2 sensor upstream of the catalytic converter, whereby the air-fuel ratio feedback control is carried out with high accuracy. According to this proposal, in controlling the air-fuel ratio of the mixture supplied to the engine to a desired value in a feedback manner responsive to the output from the upstream O2 sensor, a control amount used in the air-fuel ratio feedback control is increased or decreased for correction based on an output from the downstream O2 sensor, to thereby compensate for deviation of the actual air-fuel ratio control from a value to which the air-fuel ratio of the mixture is to be controlled, due to deterioration of the upstream O2 sensor. However, this proposed solution has a disadvantage that when the upstream O2 sensor has heavily deteriorated beyond the limit of the above-mentioned compensation, it will result in degraded exhaust emission characteristics of the engine.

To overcome this disadvantage, it has been proposed, e.g. by Japanese Provisional Patent Publication (Kokai) No. 4-72438, to detect deterioration of an upstream O2 sensor based on a correction value which corrects the above-mentioned control amount, and a repetition period of inversion of an output from the upstream O2 sensor, to thereby alert the driver for replacement for replacement of the upstream O2 sensor with a new one when it is detected to be deteriorated, so as to prevent the engine from being operated with degraded exhaust emission characteristics.

However, the above proposed method of detecting the deterioration of the O2 sensor has the following disadvantage:

When the catalytic converter is normally functioning, even if the upstream O2 sensor is slightly deteriorated to exhibit slightly degraded performance thereof, exhaust gases are purified by the action of the catalytic converter, and therefore, the exhaust emission characteristics are prevented from being degraded. However, when the catalytic converter is deteriorated in purifying function thereof, noxious components in the exhaust gases are not purified. As a result, even a slight deterioration in the performance of the upstream O2 sensor directly adversely affects the exhaust emission characteristics.

The above proposed method does not contemplate the effect of the deterioration of the catalytic converter upon the exhaust emission characteristics. That is, it merely detects the deterioration of the upstream O2 sensor only by the correction value which corrects the control amount and the repetition period of inversion of the output from the upstream O2 sensor. Consequently, when the catalytic converter is deteriorated in its purifying operation, there is a fear that the engine continues to be operated with degraded exhaust emission characteristics.

SUMMARY OF THE INVENTION

It is the object of the invention to provide an abnormality-detecting device for an internal combustion engine, which is capable of preventing the exhaust emission characteristics from being degraded due to deterioration of the catalytic converter by improving the accuracy of detection of deterioration of the O2 sensor.

To attain the above object, the present invention provides an abnormality-detecting device for an internal combustion engine having an exhaust system, catalytic converter means arranged in the exhaust system, and first and second oxygen concentration-detecting means arranged in the exhaust system at locations upstream and downstream of the catalytic converter means, comprising:

catalytic converter deterioration-detecting means for detecting a degree of deterioration of the catalytic converter means, based on an output from the second oxygen concentration-detecting means;

reference value-setting means for setting a reference value for determining an abnormality in the engine, based on the degree of deterioration of the catalytic converter means detected by the catalytic converter deterioration-detecting means;

abnormality determining means for comparing between the reference value set by the reference value-setting means and a value based on an output from the first oxygen concentration-detecting means, and determining the abnormality in the engine, based on a result of the comparison; and alarming means for issuing an alarm when the abnormality has been detected by the abnormality determining means.

The reference value-setting means sets the reference value to a value capable of detecting a lower degree of the abnormality in the engine as the detected degree of deterioration of the catalytic converter means is higher.

In a preferred embodiment of the invention, the abnormality determining means determines abnormality of the engine, based on the result of the comparison between the reference value set by the reference value-setting means and the value based on the output from the first oxygen concentration-detecting means.

Preferably, the abnormality-detecting device includes period detecting means for detecting a repetition period of inversion of the output from the first oxygen concentration-detecting means, and wherein the abnormality determining means compares between the reference value set by the reference value-setting means and the repetition period of inversion detected by the period detecting means, and determines the abnormality of the first oxygen concentration-detecting means, based on a result of the comparison.

Alternatively, the abnormality-detecting device includes correction value-calculating means for calcuating a correction value for correcting the air-fuel ratio of a mixture supplied-to the engine, based on the output from the first oxygen concentration-detecting means, amplitude detecting means for detecting amplitude of the correction value, and wherein the abnormality determining means compares between the reference value set by the reference value-setting means and the amplitude detected by the amplitude detecting means, and determines the abnormality of the first oxygen concentration-detecting means, based on a result of the comparison.

Preferably, the catalytic converter deterioration-detecting means detects the degree of deterioration of the catalytic converter means, based on a response time lag of the output from the second oxygen concentration-detecting means.

Further preferably, the abnormality-detecting device includes air-fuel ratio feedback control means for feedback controlling the air-fuel ratio of an air-fuel mixture supplied to the engine, in response to the output from the second oxygen concentration-detecting means, and wherein the response time lag is a time period from the time a predetermined control term is generated during the air-fuel ratio feedback control to the time the output from the second oxygen concentration-detecting means is correspondingly inverted.

Alternatively, the catalytic converter deterioration-detecting means detects the degree of deterioration of the catalytic converter means, based on a repetition period of inversion of the output from the second oxygen concentration-detecting means.

The above and other objects, features, and advantages of the invention will become more apparent from the following detailed description taken in conjunction with the accompanying drawings.

BRIEF DESCRIPTION OF THE DRAWINGS

FIG. 9 is a flowchart showing a routine for calculating a feedback gain to be applied in the air-fuel ratio feedback control based on the output from the upstream O2 sensor;

FIG. 10A is part of a flowchart showing a routine for calculating an air-fuel ratio correction coefficient KO2 applied in the air-fuel ratio feedback control carried out by the use of two O2 sensors;

FIG. 12A is part of a flowchart for executing a subroutine for calculating proportional terms PL, PR at a step in FIG. 11;

FIG. 12B is the remaining part of the FIG. 12A flowchart; and

DETAILED DESCRIPTION

The invention will now be described in detail with reference to drawings showing a preferred embodiment thereof.

Figure 1:
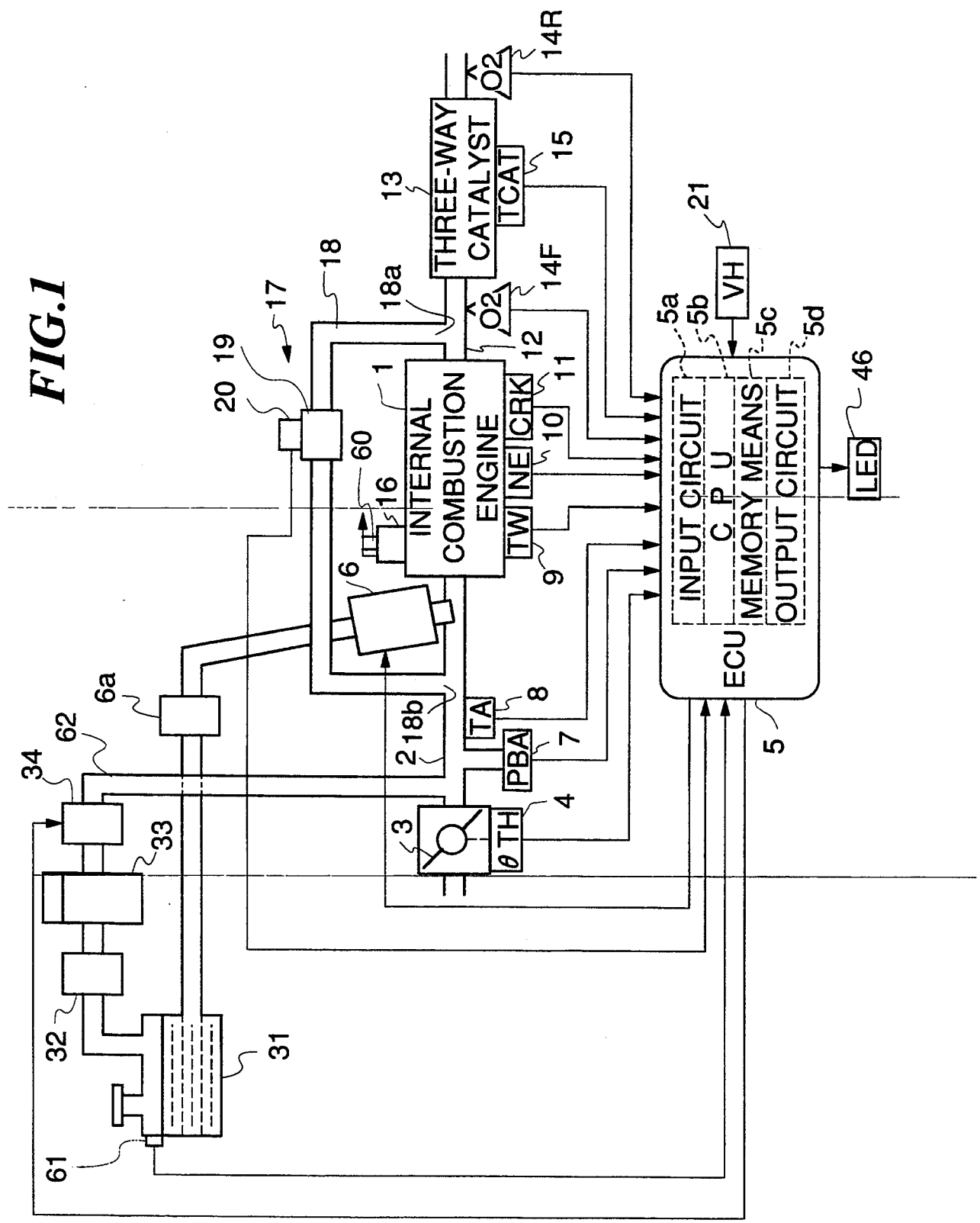
FIG. 1 is a schematic diagram showing the whole arrangement of an internal combustion engine and control systems therefor including an abnormality according to the invention.

Referring first to FIG. 1, there is shown the whole arrangement of an internal combustion engine and control systems therefor, including an abnormality-detecting device according to an embodiment of the invention. In the figure, reference numeral 1 designates an internal combustion engine having e.g. four cylinders. In an intake pipe 2 of the engine, there is arranged a throttle valve 3. The throttle valve 3 is connected to a throttle valve opening ($\theta$TH) sensor 4 for generating an electric signal indicative of the sensed throttle valve opening and supplying same to an electronic control unit (hereinafter referred to as "the ECU") 5.

Fuel injection valves 6 are each provided for each cylinder and arranged in the intake pipe 2 between the engine 1 and the throttle valve 3 at a location slightly upstream of an intake valve, not shown. Each fuel injection valve 6 is connected via a fuel pump 6a to a fuel tank 31 and electrically connected to the ECU 5 to have its valve opening period controlled by a signal therefrom.

On the other hand, an intake pipe absolute pressure (PBA) sensor 7 is provided in communication with the interior of the intake pipe 2 at a location immediately downstream of the throttle valve 3 for sensing absolute pressure (PBA) within the intake pipe 2, and is electrically connected to the ECU 5 for converting the sensed absolute pressure PBA into a corresponding electric signal and supplying same to the ECU 5. Further, at a location downstream of the absolute pressure (PBA) sensor, an intake air temperature (TA) sensor 9 is inserted into the intake pipe for supplying an electric signal indicative of the sensed intake air temperature TA to the ECU 5.

An engine coolant temperature (TW) sensor 10, which may be formed of a thermistor or the like, is mounted in a coolant-filled cylinder block of the engine for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The NE sensor 10 generates a pulse as a TDC signal pulse at each of predetermined crank angles whenever the crankshaft rotates through 180 degrees, while the CRK sensor 11 generates a pulse (hereinafter referred to as "the CRK signal pulse" at a predetermined crank angle of a particular cylinder of the engine whenever the crankshaft rotates through 30 degrees, both of the pulses being supplied therefrom.

A catalytic converter (three-way catalyst as an exhaust gas-purifying device) 13 is arranged in an exhaust pipe 12 connected to the engine 1. An upstream O2 sensor 14F and a "downstream O2 sensor 14R are arranged in the exhaust pipe 12 at respective locations upstream and downstream of the catalytic converter 13 for detecting the concentration of oxygen present in exhaust gases at respective points and supplying signals FVO2, RVO2 indicative of the sensed oxygen concentration to the ECU 5. The catalytic converter 13 is provided with a catalyst temperature (TCAT) sensor 15 for detecting the temperature of the catalytic converter 13 and supplying an electric signal indicative of the sensed catalyst temperature TCAT to the ECU 5. Each cylinder of the engine is provided with a spark plug 16. The spark plug 16 is provided with a sparking voltage sensor 60 for detecting sparking voltage generated by an ignition coil, not shown, for supplying a signal indicative of the sensed sparking voltage to the ECU 5. Also connected to the ECU 5 is a vehicle speed (VH) sensor 21 for detecting the traveling speed of a vehicle, not shown, on which the engine 1 is installed, for supplying an electric signal indicative of the sensed vehicle speed thereto.

Further, the engine 1 is provided with an exhaust gas recirculation (EGR) system 17 which comprises an exhaust gas recirculation passage 18 having one end 18a opening into the exhaust pipe 12 at a location upstream of the catalytic converter 13 and the other end 18b opening into the intake pipe 2 at a location downstream of the throttle valve 3, and an exhaust gas recirculation control valve (hereinafter referred to as "the EGR valve") 19 arranged in the passage 18 at an intermediate location thereof for controlling the flow rate of exhaust gases recirculated.

The EGR valve 19 is comprised of an electromagnetic valve electrically connected to the ECU 5 to have valve opening thereof linearly controlled by a control signal supplied therefrom. The EGR valve 19 is provided with a lift sensor 20 for detecting the valve opening thereof and supplying an electric signal indicative of the detected valve opening to the ECU 5.

The engine 1 is further provided with an evaporative emission control system. The evaporative emission control system is comprised of an evaporative fuel passage 55 connecting between the top of the fuel tank 31, which has an airtight construction, and a portion of the intake pipe 2 immediately downstream of the throttle valve 3, and a two-way valve 32, a canister 33, and a purge control valve 34, which are arranged across the passage 62. The purge control valve 34 is electrically connected to the ECU 5 to have valve opening thereof controlled by a signal from the ECU 5. Evaporative fuel generated from the fuel tank 31 forces a negative pressure valve, not shown, of the two-way valve 32 to open when the pressure of the evaporative fuel reaches a predetermined level and then flows into the canister 21 to be temporarily stored therein. When the purge control valve 34 is opened by the control signal from the ECU 5, evaporative fuel stored in the canister 33 is drawn (purged) into the intake pipe 2 together with fresh air introduced through an outside air inlet port, not shown, provided in the canister 21, and then supplied to the cylinders. When the fuel tank 31 is cooled by fresh air, etc. so that the negative pressure increases within the fuel tank 31, a negative pressure valve, not shown, of the two-way valve 32 is opened to allow the evaporative fuel temporarily stored in the canister 33 to return to the fuel tank 31. Thus, the emission of evaporative fuel generated from the fuel tank 31 into the atmosphere is controlled. Further, the fuel tank 31 is provided with a tank internal pressure sensor 51 for detecting the pressure within the fuel tank 31, and based on an output from the tank internal pressure sensor 61, leakage of evaporative fuel from the evaporative emission control system is detected by the ECU 5.

Further, the ECU 5 is connected to an LED (light emitting diode) 46 as alarming means, referred to hereinafter.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps and tables, referred to hereinafter, and a RAM for storing results of calculations therefrom, etc., and an output circuit 5d which delivers driving signals to the fuel injection valves 6, the EGR valve 19, the purge control valve 39, etc. The ECU 5 also has the function of detecting a misfire based on a change in the sparking voltage detected by the sparking voltage sensor 60 and the rotational speed of the crankshaft.

The CPU 5b operates in response to the abovementioned signals from the sensors to determine operating conditions in which the engine 1 is operating, such as an air-fuel ratio feedback control region and open-loop control regions, and calculates, based upon the determined engine operating conditions, the valve opening period or fuel injection period TOUT over which the fuel injection valves 6 are to be opened, by the use of the following equation (1):

$$TOUT = Ti \times KO2 \times KLS \times K_1 + K_2 \qquad (1)$$

where Ti represents a basic value of the fuel injection period TOUT, and is determined according to the engine rotational speed NE and the intake pipe absolute pressure PBA.

KO2 represents an air-fuel ratio correction coefficient which is determined based on outputs from the upstream and downstream O2 sensors 14F, 14R, by a feedback control program, described hereinafter, when the engine 1 is operating in the air-fuel ratio feedback control region, while it is set to predetermined values corresponding to the respective operating regions of the engine when the engine 1 is in the open-loop control regions.

KLS represents an air-fuel ratio-leaning coefficient, which is set e.g. to a value (e.g. 0.95) smaller than 1.0 when the engine is in a leaning region falling among the open-loop regions.

K1 and K2 represent other correction coefficients and correction variables, respectively, which are set according to engine operating parameters to such values as optimize engine operating characteristics, such as fuel consumption and engine accelerability.

The CPU 5b supplies driving signals via the output circuit 5d to the fuel injection valves 6, based on the fuel injection period TOUT thus determined, to open the fuel injection valves 6.

Figure 2:
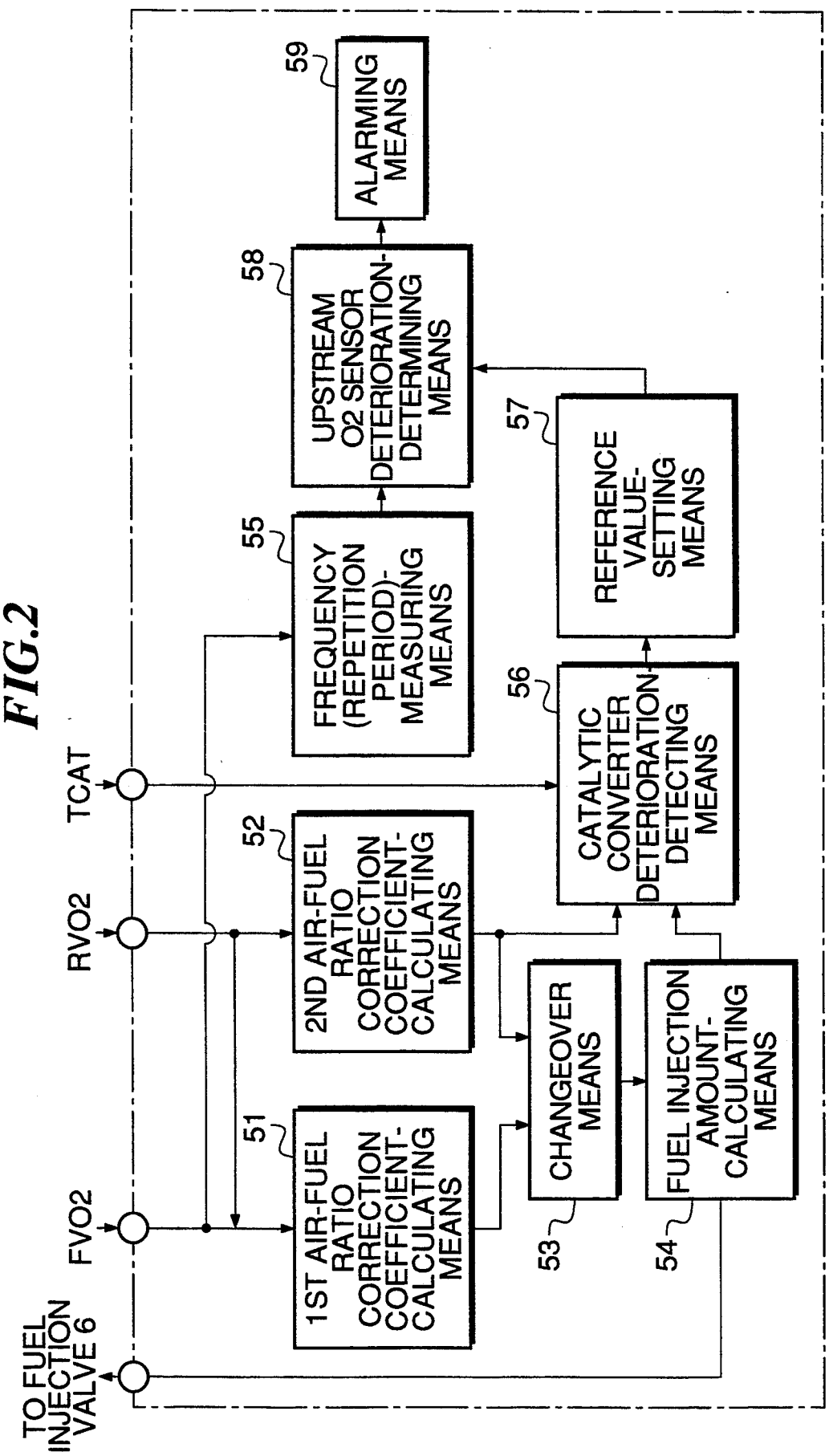
FIG. 2 is a diagram showing the internal construction of essential parts of a CPU related to the abnormality-detecting device according to an embodiment of the invention.

FIG. 2 shows the internal construction of the CPU 5b including the abnormality-detecting device according to the present embodiment.

The CPU 5b includes air-fuel ratio control means for carrying out the air-fuel ratio control in response to an output from the upstream O2 sensor 14F while correcting the air-fuel ratio feedback control characteristics based on an output from the downstream O2 sensor 14R. The air-fuel ratio control means comprises first air-fuel ratio correction coefficient-calculating means 51 which calculates a first air-fuel ratio correction coefficient based on the output FVO2 from the upstream O2 sensor 14F, second air-fuel ratio correction coefficient-calculating means 52 which calculates a second air-fuel ratio correction coefficient based on the output signal RVO2 from the downstream O2 sensor 14R, coefficient changeover means 53 which changes over coefficients between the calculated first and second air-fuel ratio correction coefficients, and fuel injection amount-calculating means 54 which calculates the fuel injection period TOUT based on the result of changeover by the changeover means 53.

Further, the CPU 5b includes O2 sensor deterioration-detecting means for detecting deterioration of the upstream O2 sensor 14F, which comprises frequency (repetition period)-measuring means 55 which calculates a repetition period of inversion (hereinafter referred to as "the inversion period"), with which the output from the upstream O2 sensor is inverted, based on the output signal FVO2 therefrom, catalytic converter deterioration-detecting means 56 which detects the deterioration degree of the catalytic converter by calculating a time period (response time lag) between the time a P term (proportional term) is generated in response to the output RVO2 from the downstream O2 sensor 14R during the air-fuel ratio feedback control, referred to hereinafter, and the time the output RVO2 from the downstream O2 sensor 14R is inverted, reference value-setting means 57 which sets a reference value for determining deterioration of the upstream O2 sensor, based on the deterioration degree of the catalytic converter, upstream O2 sensor deterioration-determining means 58 which determines deterioration of the upstream O2 sensor 14F, based on the inversion period of the output and the reference value, and alarming means 59 which lights an LED 46 based on the results of the deterioration determination thus carried out.

Alternatively of measuring the response time lag, the catalytic converter deterioration-detecting means 56 may be constructed such that deterioration is detected by measuring the inversion period of the output from the downstream O2 sensor 14R.

In the present embodiment, the reference value for determining deterioration of the upstream O2 sensor is changed according to the deterioration degree of the catalytic converter 13 in order to prevent the degradation of the exhaust emission characteristics, as described hereinafter. The outline of the deterioration determining operation will be described with respect to the individual means in FIG. 2.

The first and second air-fuel ratio correction coefficient-calculating means 51 and 52 calculate the first and second air-fuel ratio correction coefficients in response to the respective outputs FVO2 and RVO2 from the upstream O2 sensor 14F and downstream O2 sensor 14R, respectively. The coefficient-changeover means 53 supplies both of the first and second air-fuel ratio correction coefficients to the fuel injection amount-calculating means 54. Then, the fuel injection amount-calculating means 54 determines the fuel injection time period TOUT based on the first and second air-fuel ratio correction coefficients. While the air-fuel ratio feedback control is thus being carried out, the frequency-measuring means 55 measures the inversion period of the output FVO2 from the upstream O2 sensor 14F.

Next, to detect the deterioration degree of the catalytic converter 13, the air-fuel ratio feedback control is carried out only based upon the output from the downstream O2 sensor 14R. More specifically, the coefficient-changeover means 53 selectively allows the output from the second air-fuel ratio correction coefficient-calculating means 52 to pass therethrough so that only the second air-fuel ratio correction coefficient is supplied to the fuel injection amount-calculating means 54. Thus, the fuel injection amount-calculating means 54 calculates the fuel injection time period TOUT based only on the second air-fuel ratio correction coefficient, and the fuel injection valve 6 injects fuel according to the fuel injection time period TOUT. During the present air-fuel ratio feedback control based upon the output from the downstream O2 sensor 14R, the catalytic converter deterioration-detecting means 56 measures the response time lag.

The reference value-setting means 57 sets the reference value of the upstream O2 sensor 14F based on the response time lag, i.e. the deterioration degree of the catalytic converter, by the use of a reference value-setting table, referred to hereinafter, and then, the upstream O2 sensor deterioration-determining means 58 compares the inversion period of the output FVO2 from the upstream O2 sensor 14F which is measured by the frequency-measuring means 55 with the set reference value, to thereby determine the deterioration of the upstream O2 sensor 14F. Alternatively of measuring the inversion period of the output FVO2 from the upstream O2 sensor 14F, the frequency-measuring means 55 may measure the amplitude of the first air-fuel ratio correction coefficient. In this case, the upstream O2 sensor deterioration-determining means 58 may compare the measured amplitude of the first air-fuel ratio correction coefficient with the set reference value, to thereby determine the deterioration of the upstream O2 sensor 14F.

Figure 3:
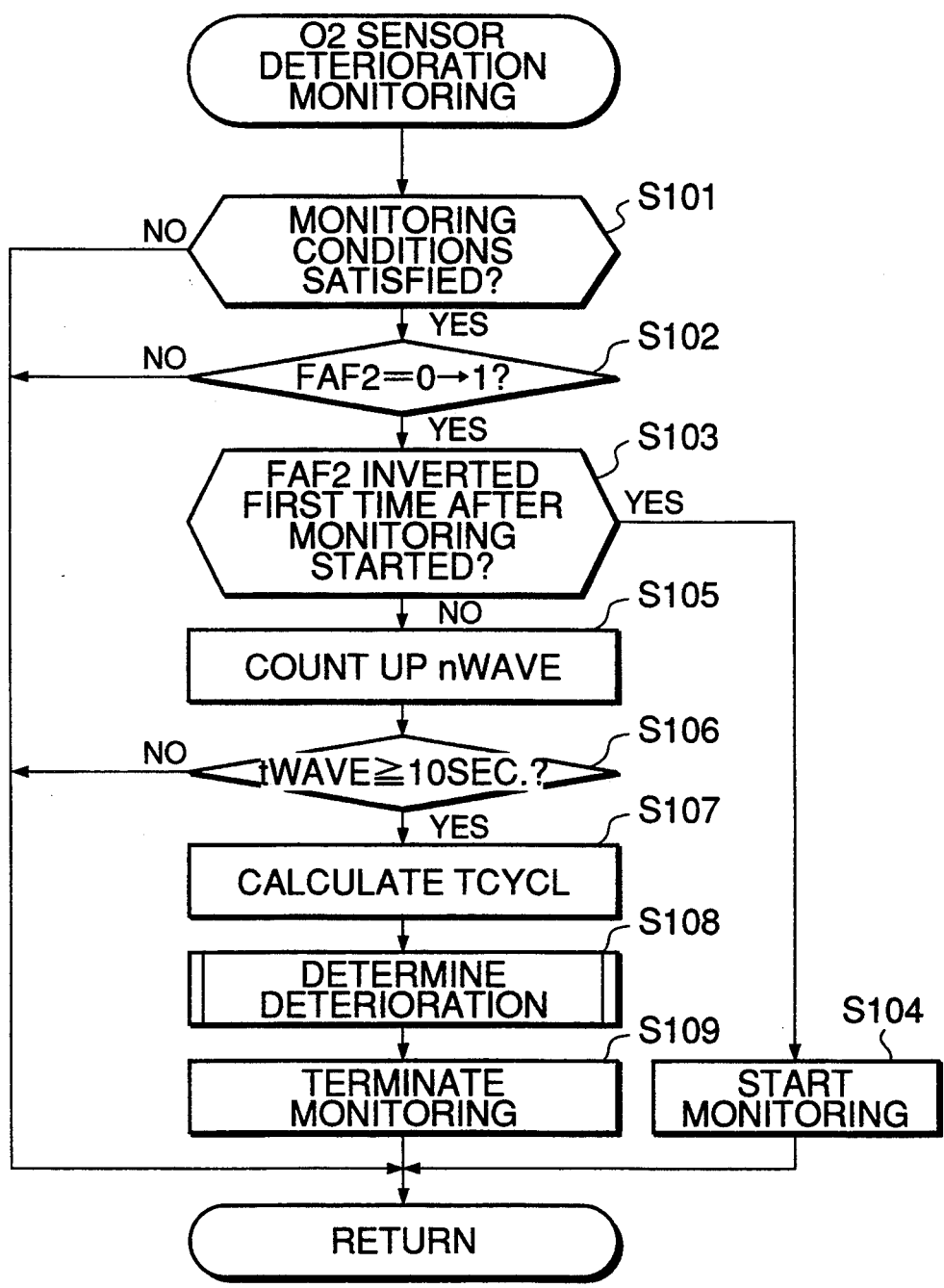
FIG. 3 is a flowchart showing a main routine for detecting deterioration of an upstream O2 sensor.

FIG. 3 shows a program for executing detection of abnormality (deterioration monitoring) of the upstream O2 sensor 14F, which is executed at intervals of 5 msec.

First, at a step S101, it is determined whether or not monitoring conditions under which the deterioration monitoring can be carried out are satisfied. If the monitoring conditions are not satisfied, the present routine is immediately terminated, while if the monitoring conditions are satisfied, the program proceeds to a step S102.

At the step S102, it is determined whether or not a flag FAF2, referred to hereinafter (see a step S923 in FIG. 10B), has been changed from "0" to "1". If the flag FAF2 remains equal to "0", the present routine is immediately terminated. On the other hand, if the flag FAF2 has been changed from "0" to "1", i.e. if a delay time CDLY1 has elapsed after the output FVO2 from the upstream O2 sensor 14F was inverted from a lean value to a rich value on the last occasion, the program proceeds to a step S103, where it is determined whether or not the inversion of the output from the upstream O2 sensor 14F has first taken place after the present monitoring of the O2 sensor 14F was permitted. If this determination is carried out for the first time, it is the first inversion after the monitoring of the upstream O2 sensor 14F has been permitted, so that the answer to the question is affirmative (YES), and then the program proceeds to a step S104, where the upstream O2 sensor 14F starts to be monitored, followed by terminating the program.

When the second and subsequent inversions of the O2 sensor output take place after the monitoring of the upstream O2 sensor 14F was permitted, the answer to the question of the step S103 is negative (NO), and then the program proceeds to a step S105, where the number nWAVE of inversions is counted, i.e. the number nWAVE is increased by an increment of 1 whenever an inversion takes place, and then at a step S106, it is determined whether or not a time period tWAVE measured after the monitoring started exceeds a predetermined value (e.g. 10 sec.). If the answer to this question is negative (NO), the present routine is immediately terminated, whereas if the answer is affirmative (YES), the program proceeds to a step S107, where a inversion period TCYCL is calculated by the use of the following equation (2):

$$TCYCL = tWAVE/nWAVE \quad (2)$$

In this connection, a counter (upcounter) for measuring the time period tWAVE is reset to "0" and started when the monitoring is started at the step S104. Similarly, a counter (upcounter) for measuring the number nWAVE is reset and started at the step S104.

After the inversion cycle TCYCL is calculated at the step S107, a deterioration determination, described in detail hereinafter, is carried out at a step S108 to determine deterioration of the upstream O2 sensor 14F. The results of the determination i.e. the monitoring are stored into the memory means 5c, followed by terminating the present program.

Figure 4:
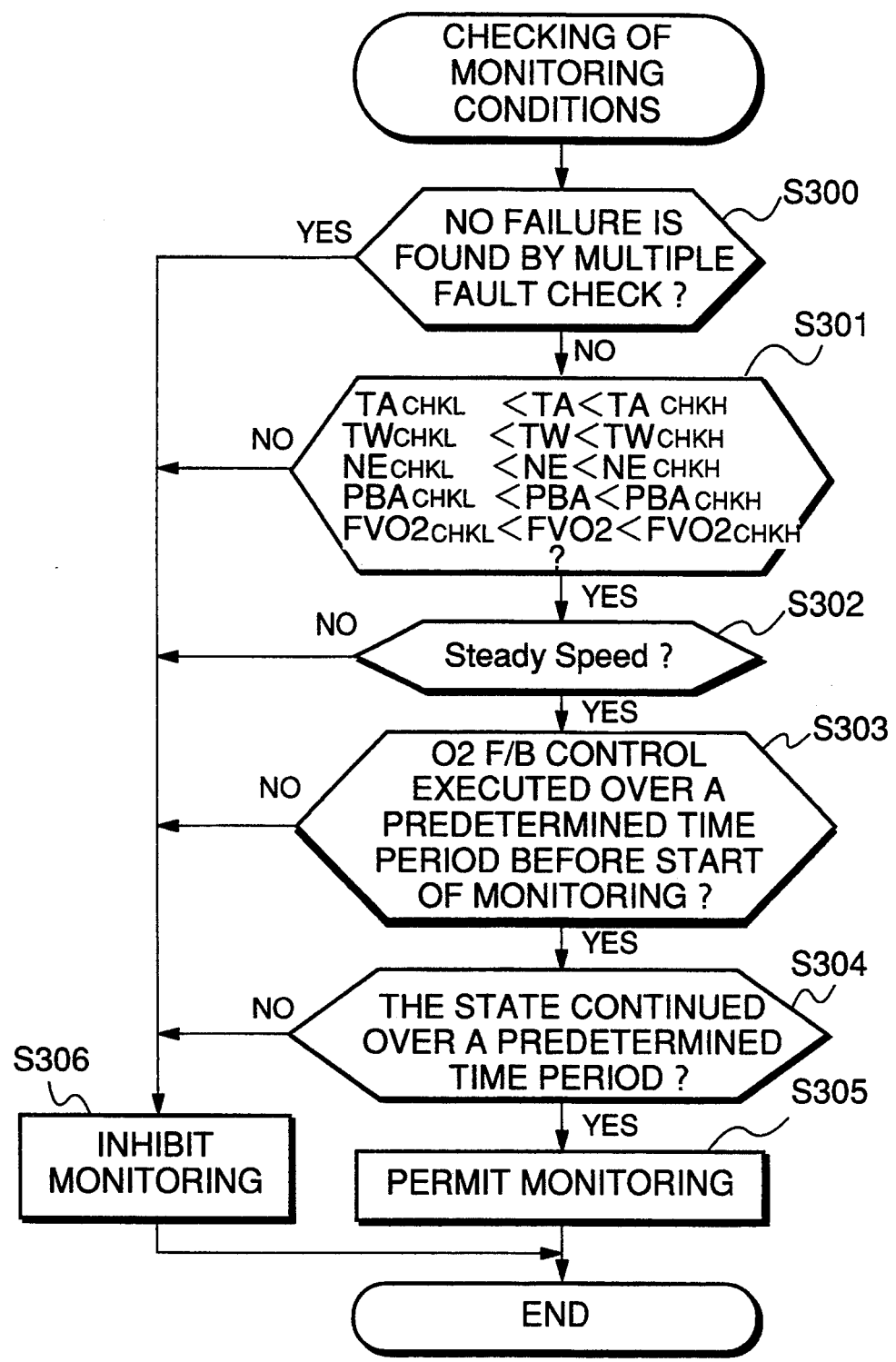
FIG. 4 is a flowchart showing a subroutine for determining whether or not monitoring conditions are satisfied for starting the monitoring of an output from the upstream O2 sensor.

FIG. 4 shows a monitoring condition fulfillment-determining subroutine which is executed at the step S101 of the FIG. 3 program. First, at a step S300, a multiple fault check, described in detail hereinafter, is carried out, and then at a step S301, operating conditions of the engine 1 are determined. More specifically it is determined whether or not an output TA from the intake air temperature sensor 8 falls within a predetermined range TACHKL to TACHKH (e.g. 60° C. to 100° C.), whether or not an output TW from the coolant temperature sensor 9 falls within a predetermined range TWCHKL to TWCHKH (e.g. 60° C. to 100° C.), whether or not an output NE from the engine rotational speed sensor 10 falls within a predetermined range NECHKL to NECHKH (e.g. 2800 rpm to 3200 rpm), whether or not an output PBA from the intake pipe absolute pressure sensor 7 falls within a predetermined range PBACHKL to PBACHKH (e.g. −350 mmHg to −250 mmHg), and whether or not the output FVO2 from the upstream O2 sensor FVO2 falls within a predetermined range FVO2CHKL to FVO2CHKH. Then, it is determined at a step S302 whether or not the vehicle speed VH is steady, i.e. whether or not an output VH from the vehicle speed sensor continues to be within a variation range of 0.8 km/sec over a predetermined time period (e.g. 2 seconds). Then, it is determined at a step S303 whether or not the air-fuel-ratio feedback control has been carried out over a predetermined time period (e.g. 10 sec.) before the monitoring was permitted at the step S303. Further, it is determined at a step S304 whether or not all the above conditions have continued to be satisfied over a predetermined time period (e.g. 2 sec.).

Then, if the answers to the questions of the above steps S301 to S304 are all affirmative (YES), the monitoring of the upstream O2 sensor 14F is permitted at a step S105, and then the program proceeds to a step S102 in FIG. 3, whereas if any of them is negative (NO), the monitoring of same is inhibited at a step S306, followed by terminating the main routine in FIG. 3.

Then, the multiple fault check, which is executed at the step S300 of the monitoring condition fulfillment-determining subroutine in FIG. 4, will be described in detail with reference to FIG. 5.

Figure 5:
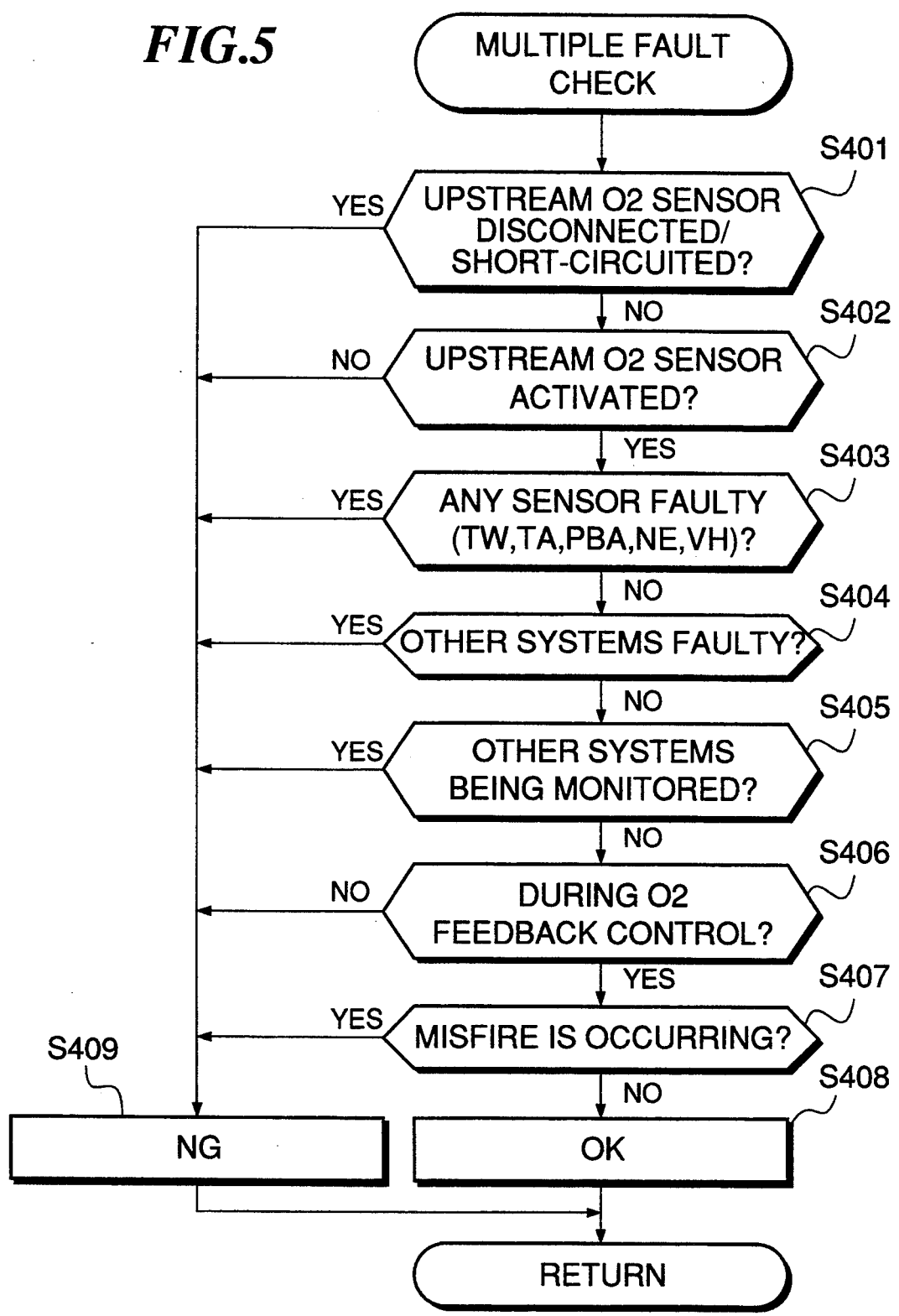
FIG. 5 is a flowchart showing a subroutine for executing a multiple fault check at a step of the FIG. 4 subroutine.

In FIG. 5, first at a step S401, it is determined whether or not the upstream O2 sensor 14F has been disconnected or short-circuited. If the answer to this question is negative (NO), the program proceeds to a step S402, where it is determined whether or not the upstream O2 sensor 14F has been activated. These deteriorations at the step S401 and S402 are carried out by checking an output voltage from the upstream O2 sensor 14F, or by measuring the internal impedance of the upstream O2 sensor 14F by applying a predetermined voltage thereto. If the answer to the question of the step S402 is affirmative (YES), i.e. if the upstream O2 sensor 14F is neither disconnected nor short-circuited and at the same time it has been activated, the program proceeds to a step S403.

At the step 403, it is determined whether or not various sensors are abnormal. More specifically, it is determined whether or not any of the PBA sensor 7, the TA sensor 8, the TW sensor 9, the VH sensor 21, and the NE sensor 10 is abnormal. This determination is made by checking disconnection/short-circuit, etc., based on an output voltage from each sensor. If it is determined that there is no abnormality in any of these sensors, the program proceeds to a step S404.

At the step S404, it is determined whether or not the downstream O2 sensor 14R, the evaporative emission control system 31-34 and 55, the EGR system 17, and the fuel supply system (including the fuel injection valves 6) are abnormal, and further whether or not the rate of occurrence of misfires has reached a predetermined value. The determination as to abnormality of the downstream O2 sensor 14R is made by checking a disconnection/short-circuit, based on whether or not the output voltage falls outside a predetermined range. The determinations as to abnormalities of the above systems include determinations as to improperly-carried out control of recirculation of exhaust gases for the EGR system 17, which is detected, e.g. from holding of an output from the lift sensor 20 to a fixed value, leakage of evaporative fuel from the fuel tank 31 etc. for the evaporative emission control system, a deviation from a controllable range of the fuel supply amount and the like for the fuel supply system. If no abnormality is found in any of the sensor and systems, and at the same time the rate of occurrence of misfires has not reached the predetermined value, the program proceeds to a step 405.

At the step S405, it is determined, by executing a monitoring execution control program described hereinafter with reference to FIG. 6, whether or not monitoring of any of various devices (such as the catalytic converter 13) and systems (such as the evaporative emission control system, and fuel supply system) is being executed for detecting abnormality thereof. If the answer to this question is negative (NO), the program proceeds to a step S406, where it is determined whether or not the air-fuel ratio feedback control is being carried out. If the air-fuel ratio is being carried out, it is determined at a step S407 whether or not a misfire has been currently detected. If no misfire has been detected, it is determined at a step S408 that results of the multiple fault check are good.

If it is determined that the results of the multiple fault check are good, the answer to the question of the step S300 are affirmative (YES), and then the program proceeds therefrom to the step S301.

On the other hand, if any of these steps S401, S403 to S405, and S407 is affirmative or if either of the step S402 or S406 is negative (NO), i.e. if the upstream O2 sensor 14F is disconnected/short-circuited, or is not activated, any of the sensors, the evaporative emission control system, the EGR system 17 and the fuel supply system is abnormal, or if the rate of occurrence of misfires has reached or exceeded the predetermined value, or monitoring of the sensors and systems is being executed, or the air-fuel ratio feedback control is not being carried out, or a misfire has been currently detected, it is determined at a step S409 that the results of the multiple fault check are not good for executing the monitoring of the upstream O2 deterioration, and accordingly it is determined at the step S306 that the monitoring of same should be inhibited.

Figure 6:
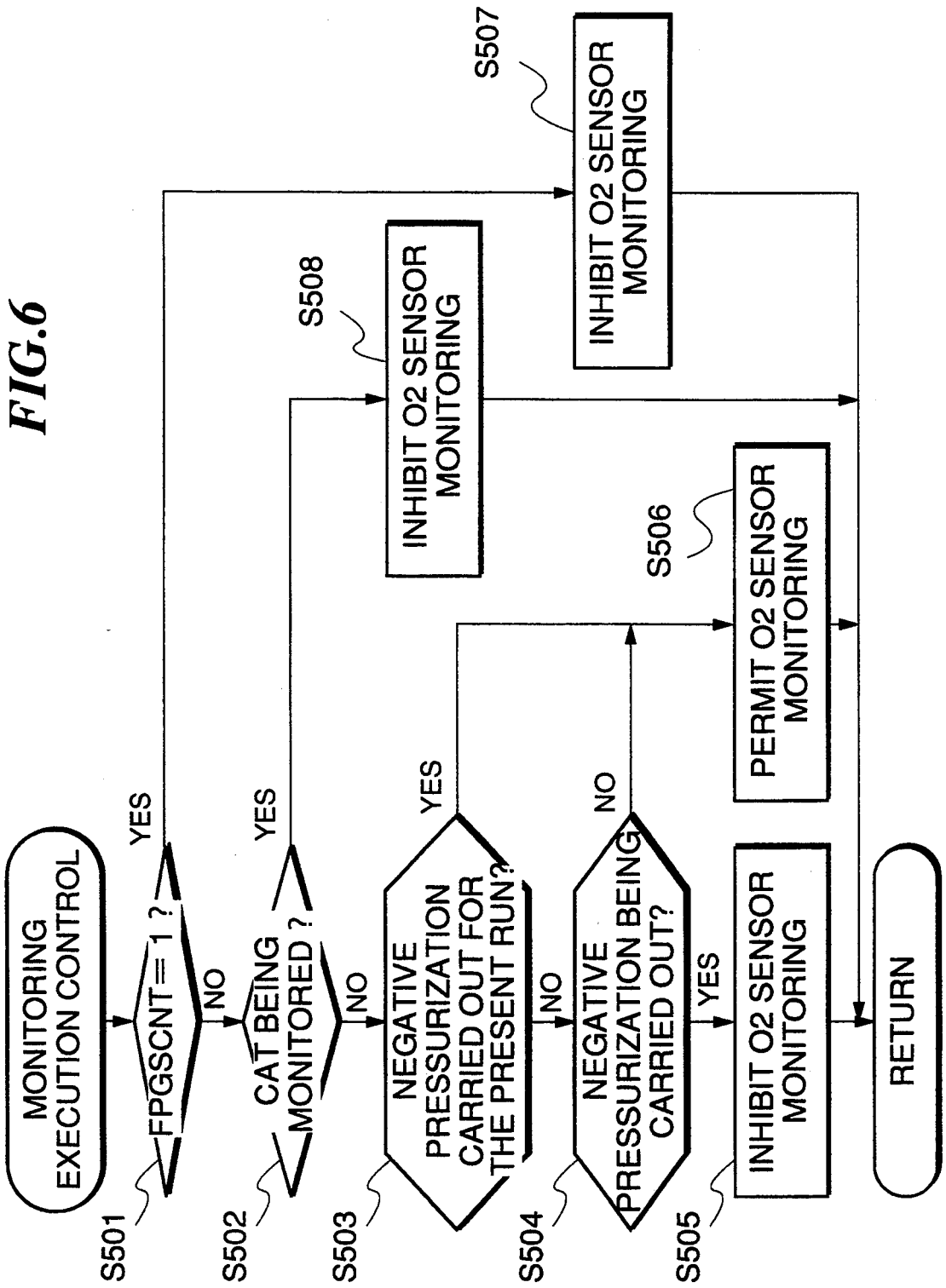
FIG. 6 is a flowchart showing a subroutine for executing a monitor execution control at a step of the FIG. 5 subroutine.

FIG. 6 shows the aforementioned monitoring execution control program executed at the step S405 in the FIG. 5 routine.

First, at a step S501, it is determined whether or not a flag FPGSCNT has been set to "1" to indicate the status of execution of a purge cut for monitoring the fuel supply system. If the flag FPGSCNT is "0", which means that the purge cut for monitoring the fuel supply system is not being carried out, the program proceeds to a step S502. At the step S502, it is determined whether or not abnormality of the catalytic converter 13 is being checked. If the answer to this question is negative (NO), the program proceeds to a step S503.

At the following steps S503 to S504, it is determined whether or not the evaporative emission control system is being monitored. More specifically, the monitoring of this system is carried out according to the following steps: an open-to-atmosphere step in which the system is relieved to the atmosphere, a tank internal pressure variation-checking step in which the fuel tank is closed and isolated from the rest of the system and a variation in the tank internal pressure, i.e. pressure of evaporative fuel within the tank is measured to check an amount of evaporative fuel generated in the fuel tank, a tank internal pressure-reducing step in which the system is negatively pressurized to a predetermined negative level by utilizing negative pressure created within the intake system, and a leak down check step in which the tank internal pressure being restored from the predetermined negative level is checked to determine a leakage of evaporative fuel from the system.

At the step S503, it is determined whether or not the tank internal pressure-reducing step has been carried out at least one time after the vehicle started to run. If the answer to this question is negative (NO), i.e. if the tank internal pressure-reducing step has not yet been carried out, the program proceeds to a step S504, where it is determined whether or not the tank internal pressure-reducing step is currently being carried out. If the answer to this question is affirmative (YES), the monitoring of the O2 sensor is inhibited at the step S505 since the air-fuel ratio will be liable to change due to negative pressurization of the evaporative emission control system if the monitoring is executed.

If the answer to the question of the step S504 is negative (NO), the program proceeds to a step S506, where the monitoring of the upstream O2 sensor 14F is permitted.

On the other hand, if the answer to the question of the step S503 is affirmative (YES), the program also proceeds to the step S506 to permit the monitoring of the upstream O2 sensor.

If the answer to the question of the step S501 is affirmative (YES), i.e. if the flag FPGSCNT is equal to "1", the program proceeds to a step S507, where the monitoring of the upstream O2 sensor is inhibited since the purge cut of evaporative fuel is being carried out for monitoring the fuel supply system and hence the air-fuel ratio will be liable to change if the monitoring is executed. If the answer to the question of the step S502 is affirmative (YES), i.e. if the catalytic converter 13 is being checked for abnormality thereof, the monitoring of the upstream O2 sensor is inhibited at a step S508 since the air-fuel ratio control based on the output from the downstream O2 sensor alone is carried out for detecting abnormality thereof, so that even if the upstream O2 sensor is normally functioning, the inversion period of inversion of the output from the upstream O2 sensor will become long, leading to an erroneous detection of abnormality thereof if the monitoring of the upstream O2 sensor is executed.

As is clear from the above, at the steps S505, S507, and S508, the monitoring of the upstream O2 sensor is not permitted when the monitorings of the evaporative emission control system, the fuel supply system, and the catalytic converter 13 are being executed. Accordingly, the answer to the question of the step S405 in the FIG. 5 routine becomes affirmative (YES), so that the results of the multiple fail check by the FIG. 5 routine are not good (NG). The monitoring of the upstream O2 sensor is permitted at the step S506 of the FIG. 6 routine, only when none of the evaporative emission control system, the fuel supply system and the catalytic converter 13 are being monitored. In this case, the answer to the question of the step S405 becomes negative (NO) accordingly, and then the program proceeds to the step S405.

Figure 7:
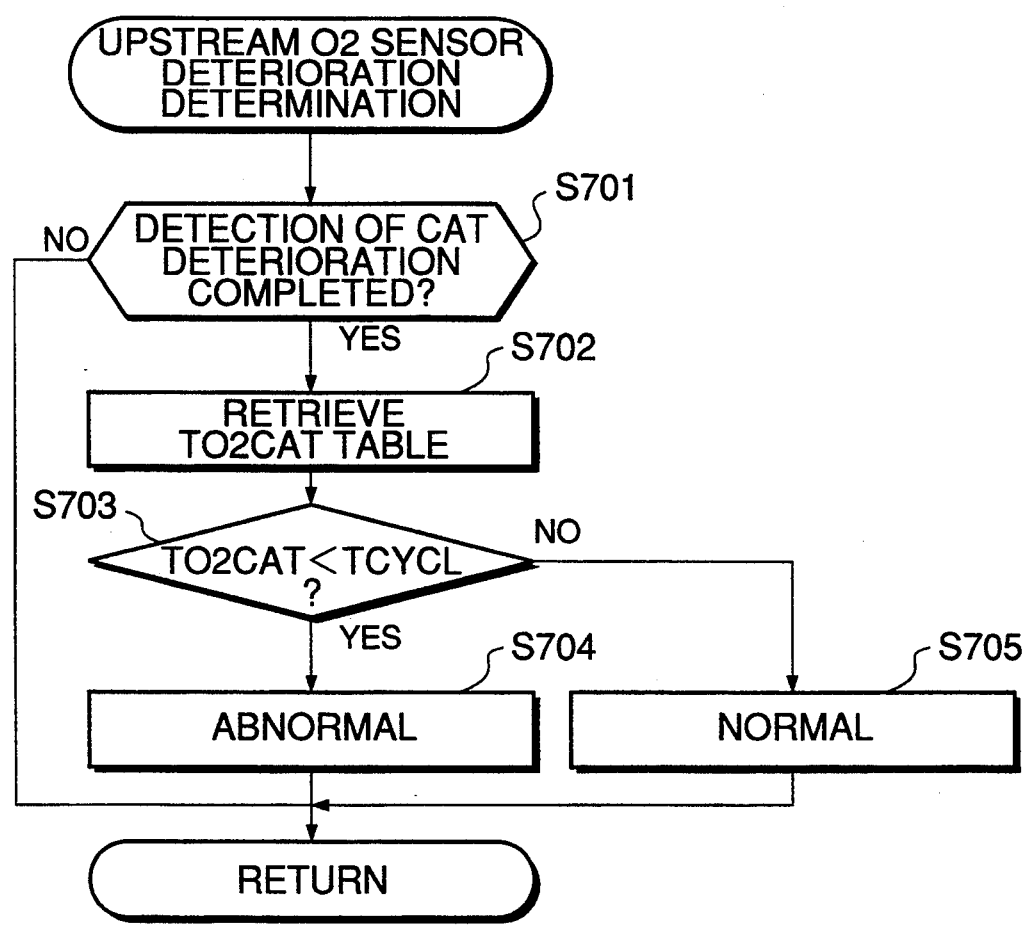
FIG. 7 is a flowchart showing a subroutine for executing determination of an O2 sensor deterioration at a step of the FIG. 3 main routine.

FIG. 7 shows a subroutine for determination of deterioration of the upstream O2 sensor 14F which is executed at the step S108 of the FIG. 3 subroutine.

Figure 8:
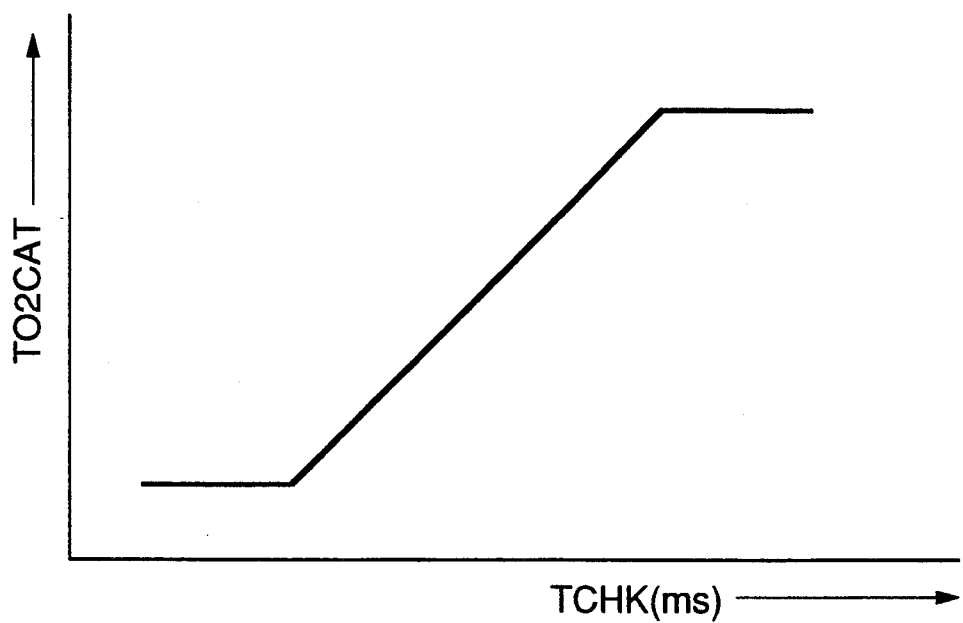
FIG. 8 is a diagram showing a reference value-setting table used for executing determination of the O2 sensor deterioration at a step of the FIG. 7 subroutine.

This subroutine is carried out by the reference value-setting means 57 and the upstream O2 sensor deterioration-determining means 58 in FIG. 2. First, at a step S701, it is determined whether or not the detection of the deterioration degree of the catalytic converter 13 has been completed. For example, if the deterioration degree of the catalytic converter 13 has been detected from the response time lag TCHK in the aforementioned manner, a reference value TO2CAT for determining deterioration of the upstream O2 sensor 14F is retrieved at a step S702 by the use of the reference value-setting table (corresponding to the reference value-setting means 57) shown in FIG. 8.

The reference value-setting table is set such that the reference value TO2CAT of the upstream O2 sensor 14F linearly increases with increase of the response time lag TCHK (corresponding to the deterioration degree of the catalytic converter 13) which is measured by the catalytic converter deterioration-detecting means 56. The table shows that the shorter the response time lag TCHK, the more the catalytic converter 13 deteriorated.

Next, at a step S703, it is determined whether or not the inversion period TCYCL calculated at the step S107 in FIG. 3 is longer than the reference value TO2CAT. If the inversion period TCYCL is longer than the reference value TO2CAT, it is judged at a step S704 that the upstream O2 sensor 14F is deteriorated, and the alarm means 59 raises an alarm to turn the LED 46 on, followed by terminating the routine. If it is determined at the step S703 that the inversion period TCYCL is shorter than the reference value TO2CAT, it is judged at a step S705 that the upstream O2 sensor 14F is normal, followed by terminating the routine.

As described hereinabove, since the shorter the response time lag TCHK, the more the catalytic converter 13 deteriorated, the reference value TO2CAT retrieved from the reference value-setting table has a smaller value as the degree of deterioration of the catalytic converter 13 is higher. This results in that even a slight deterioration of the upstream O2 sensor 14F can be detected as an abnormality. Thus, the deterioration detecting accuracy of the upstream O2 sensor 14F is improved. Further, when it is determined that the upstream O2 sensor 14F is abnormal, the LED 46 is lighted to urge the replacement of the sensor, thereby preventing the exhaust emission characteristics from being degraded due to the deterioration of the catalytic converter 13.

In this way, the monitoring of the upstream O2 sensor 14F is executed.

The following description will refer to the air-fuel ratio feedback control based on the outputs from the upstream and downstream O2 sensors 14F and 14R (hereinafter referred to as "the 2-O2 sensor F/B control").

FIG. 9 shows a program for determining a feedback gain used in the 2-O2 sensor F/B control, which gain is determined in response to the output from the upstream O2 sensor 14F. Basically, the feedback gain is determined based on the engine rotational speed NE and the intake pipe absolute pressure PBA.

First, at a step S801, it is determined whether or not the engine is in an idling condition. If it is determined that the engine is idling, a proportional term (P term) coefficient KP, an integral term I, and delay time factors TDL1 (which corresponds to P term-adding delay time) and TDR14 (which corresponds to P term-subtracting delay time), which are to be applied when the engine is idling, are read from maps for idling at a step S802, followed by terminating the program. If it is determined at the step S801 that the engine is not idling, the program proceeds to a step S803.

At the step S803, it is determined whether or not the output from the upstream O2 sensor 14F is in a steady state. This determination is carried out by determining whether or not the engine coolant temperature TW is low, whether or not variation in the engine rotational speed NE is large, whether or not variation in the intake pipe absolute pressure PBA is large, whether or not variation in the throttle valve opening $\theta$TH is large, etc. If the output upstream O2 sensor 14F is in a steady state, the coefficient KP, integral term I, delay time factor TDL1, and delay time factor TDR1 are determined at a step S804 by retrieving respective maps (hereinafter referred to as "the steady condition maps) according to the engine rotational speed NE and the intake pipe absolute pressure PBA, followed by terminating the program. In this connection, the steady condition maps are set such that values of the coefficient KP, the integral term I, and the delay time factors TDL1, TDR1 suitable for steady conditions of the engine 1 are provided correspondingly to values of the engine rotational speed NE and the intake pipe absolute pressure PBA.

If the answer to the question of the step S803 is negative (NO), i.e. if the output from the upstream O2 sensor 14F is in a transient state, the coefficient KP, the integral term I, and delay time TDL1, TDR1 are determined at a step S805 by retrieving respective maps (hereinafter referred to as "the transient condition maps) according to the engine rotational speed NE and the intake pipe absolute pressure PBA, followed by terminating the program. In this connection, the transient condition maps are set such that values of the coefficient KP, the integral term I, the delay time factors TDL1, TDR1 suitable for the transient condition of the engine 1 are provided correspondingly to values of the engine rotational speed NE and the intake pipe absolute pressure PBA.

Figure 10B:
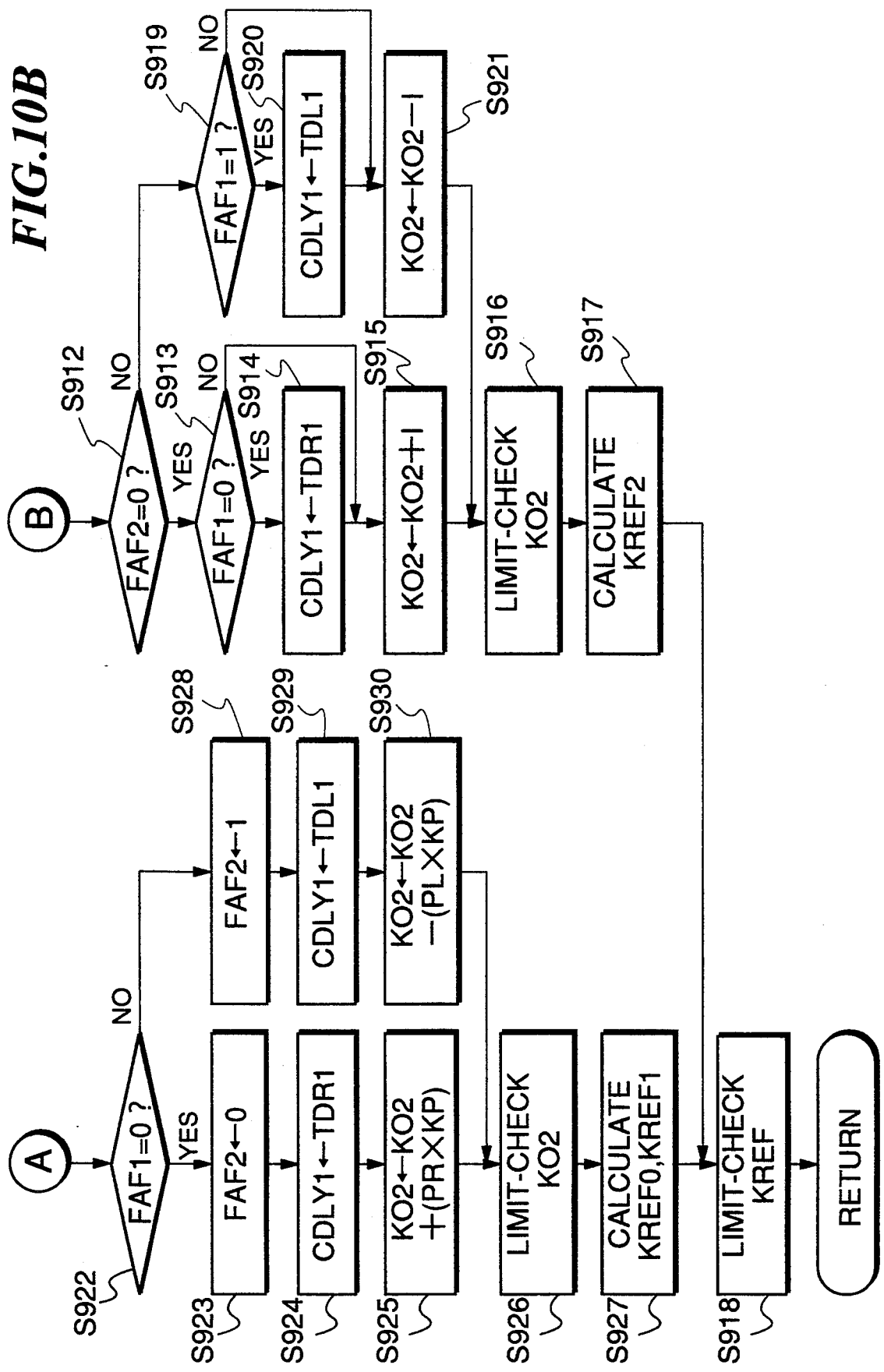
FIG. 10B is the remaining part of-the FIG. 10A flowchart.

FIG. 10A and FIG. 10B show a program for calculating the air-fuel ratio correction coefficient KO2 applied during the 2-O2 sensor F/B control, which is executed at intervals of 5 msec. Here, the air-fuel ratio correction coefficient KO2 is calculated based on the output FVO2 from the upstream O2 sensor 14F and the output RVO2 from the downstream O2 sensor 14R, such that the air-fuel ratio of the air-fuel mixture supplied to the engine becomes equal to a stoichiometric value ($\lambda = 1$).

First, at a step S901, flags FAF1 and FAF2 are initialized. The flag FAF1 indicates lean and rich states of the output FVO2 from the upstream O2 sensor 14F, respectively, when set to "0" and "1", and the flag FAF2 indicates lean and rich states of same after the lapse of a predetermined delay time has been counted up by a counter CDLY, referred to hereinafter. Then, at a step S902, the air-fuel ratio correction coefficient KO2 is initialized (e.g. set to an average value KREF thereof), followed by the program proceeding to a step S903.

The steps S901 and S902 are carried out only once when the KO2-calculating program is started.

At the step S903, it is determined whether or not the air-fuel ratio correction coefficient KO2 has just been initialized in the present loop. If the answer to this question is negative (NO), the program proceeds to a step S904, where it is determined whether or not the upstream O2 sensor output FVO2 is lower than a reference value FVREF (threshold value for determining whether the output FVO2 is rich or lean). If the answer to this question is affirmative (YES), i.e. if FVO2<FVREF, it is determined that the output FVO2 indicates a lean value, and then the flag FAF1 is set to "0" at a step S905, and at the same time the count value CDLY1 of the counter CDLY for counting P term-adding/subtracting delay time is decreased by a decrement of 1.

More specifically, if FVO2<FVREF, the flag FAF1 is set to "0" and the count value CDLY1 of the counter CDLY is decreased by a decrement of 1 whenever the present step is carried out. Then, at a step S906, it is determined whether or not the count value CDLY1 is smaller than the aforementioned delay time factor TDR1. If the answer to this question is affirmative (YES), i.e. if CDLY1<TDR1, the count value CDLY1 is set to the delay time factor TDR1 at a step S907.

On the other hand, if the answer to the question of the step S904 is negative (NO), i.e. if FVO2≧FVREF, which means that the output FVO2 indicates a rich value, the flag FAF1 is set to "1", and at the same time the count value CDLY1 is increased by an increment of 1 at a step S908. More specifically, if FVO2≧FVREF, the flag FAF1 is set to "1" and the count value CDLY1 of the counter CDLY is increased by an increment of 1 whenever the present step is carried out. Then, at a step S909, it is determined whether or not the count value CDLY1 is smaller than the aforementioned delay time factor TDL1. If the answer to this question is negative (NO), i.e. if CDLY1<TDL1, the count value CDLY1 is set to the delay time factor TDL1 at a step S910.

If the answer to the question of the step S906 is negative (NO), i.e. if CDLY1≧TDR1, the program skips over the step S907 to a step S911. Similarly, if the answer to the question of the step S909 is affirmative (YES), i.e. if CDLY1<TDL1, the program skips over the step S910 to the step S911.

At the step S911, it is determined whether or not the sign of the count value CDLY1 has been inverted. That is, it is determined whether or not the delay time factor TDR1 or TDL1 has been counted up after the output FVO2 from the upstream O2 sensor 14F crossed the reference value FVREF. Actually, the delay time factors TDR1 and TDL1 are negative and positive count values, respectively, and hence it is determined here whether or not a delay time period corresponding to the absolute value of the delay time factor TDR1 or that of the delay time factor TDL1 has elapsed after the output FVO2 crossed the reference value FVREF. If the answer to this question is negative (NO), i.e. if the delay time period has not elapsed, the program proceeds to a step S912, where it is determined whether or not the flag FAF2 has been set to "0". If the answer to this question is affirmative (YES), it is determined at a step S913 whether or not the flag FAF1 has been set to "0". If the answer to this question is affirmative (YES), it is judged that the air-fuel ratio has continuously been lean, so that the program proceeds to a step S914, where the count value CDLY1 is set to the delay time factor TDR1, followed by the program proceeding to a step S915. If the answer to the question of the step S913 is negative (NO), it is judged that the delay time has not elapsed yet after the output FVO2 from the upstream O2 sensor was inverted from a lean side to a rich side, i.e. after it crossed the reference value FVREF, so that the program skips over the step S914 to the step S915.

At the step S915, a present value of the air-fuel ratio correction coefficient KO2 is obtained by adding the integral term I to a value of the coefficient KO2 calculated in the immediately preceding loop by the use of the following equation (3):

$$KO2 = KO2 + I \quad (3)$$

After execution of the step S915, limit-checking of the resulting value of the correction coefficient KO2 is performed by a conventional method at a step S916, calculation of a value KREF2 (learned value of the correction coefficient KO2 used in starting the vehicle) at a step S917, and limit-checking of the resulting value KREF2 at a step S918, followed by terminating the program.

On the other hand, if the answer to the question of the step S912 is negative (NO), i.e. if the flag FAF2 is equal to "1", it is further determined at a step S919 whether or not the flag FAF1 is equal to "1". If the answer to this question is affirmative (YES), it is judged that the air-fuel ratio has continuously been rich, and then at a step S920, the count value CDLY1 is set to the delay time factor TDL1 again, followed by the program proceeding to a step S921. On the other hand, if the answer to the question of the step S919 is negative (NO), it is judged that the delay time period has not elapsed yet after the output FVO2 from the upstream O2 sensor 14F was inverted from the rich side to the lean side, so that the program skips over the step S920 to a step S921. At the step S921, the present value of the correction coefficient KO2 is calculated by subtracting the integral term I from the immediately preceding value of the correction coefficient KO2 by the use of the equation (4):

$$KO2 = KO2 - I \quad (4)$$

Then, the above steps S916 to S918 are carried out, followed by terminating the routine.

Thus, when the sign of the count value CDLY1 of the counter CDLY has not been inverted, the status of the flag FAF2 is checked, and the correction coefficient KO2 is calculated based on results of the check. Further, the status of the flag FAF1 is checked to determine whether the output FVO2 from the upstream O2 sensor 14F has been inverted from the lean side to the rich side or vice versa, and depending upon results of this determination, the count value CDLY1 for measuring the delay time is increased by an increment of 1 or decreased by a decrement of 1, or it is held to the predetermined delay time factor (TDR1 or TDL1).

On the other hand, if the answer to the question of the step S911 is affirmative (YES), i.e. if the sign of the count value CDLY1 has been inverted, that is, if a time period corresponding to the absolute value of the delay time factor TDR1 or the delay time factor TDL1 has elapsed after the output FVO2 from the upstream O2 sensor 14F was inverted from the lean side to the rich side or vice versa, the program proceeds to a step S922, where it is determined whether or not the flag FAF1 is equal to "0", i.e. whether or not the output FVO2 from the upstream O2 sensor 14F indicates a lean value. If the answer to the question of the step S922 is affirmative (YES), i.e. if FAF1=0 (the output FVO2 indicates a lean value), the program proceeds to a step S923, where the flag FAF2 is set to "0", and then at a step S924, the count value CDLY1 is set to the delay time factor TDR1, followed by the program proceeding to a step S925.

At the step S925, the present value of correction coefficient KO2 is calculated by adding the product of a proportional term PR and the coefficient KP to the immediately preceding value of correction coefficient KO2 by the use of the following equation (5):

$$KO2 = KO2 + (PR \times KP) \quad (5)$$

where KO2 on the right side represents the immediately preceding value of the correction coefficient KO2, and the proportional term PR a correction term employed for shifting the air-fuel ratio toward the rich side by increasing the correction coefficient KO2 in a stepped manner when the delay time period corresponding to the count value TDL1 has elapsed after the output FVO2 from the upstream O2 sensor 14F was inverted from the rich side to the lean side,,and is varied according to the output RVO2 from the downstream O2 sensor 14R (A manner of calculation thereof will be described hereinbelow). Further, the coefficient KP is set at the aforementioned step S802, S804, or S805.

Then, limit-checking of the correction coefficient KO2 is carried out at a step S926, and a value KREF0 (average value of the correction coefficient KO2 calculated during idling of the engine) and a value KREF1 (average value of the correction coefficient KO2 calculated when the engine is not idling) are calculated at a step S927. Then, the program proceeds to the step S918, followed by terminating the program.

If the answer to the question of the step S922 is negative (NO), i.e. if the output FVO2 from the upstream O2 sensor 14F indicates a rich value (FAF1=1), the program proceeds to a step S928, where the flag FAF2 is set to "1", and then at a step S929, the count value CDLY1 is set to the delay time factor TDL1, followed by the program proceeding to the step S930.

At the step S930, the present value of the correction coefficient KO2 is calculated by subtracting the product of the proportional term PL and the coefficient KP from the immediately preceding value of the correction coefficient KO2 by the use of the following equation:

$$KO2 = KO2 - (PL \times KP) \qquad (6)$$

where KO2 on the right side represents the immediately preceding value of the correction coefficient KO2, and the proportional term PL a correction term employed for shifting the air-fuel ratio toward the lean side by decreasing the correction coefficient KO2 in a stepped-up manner when the delay time factor TDR1 has elapsed after the output FVO2 from the upstream O2 sensor 14F has been inverted from the lean side to the rich side with respect to a stoichiometric value, and is varied according to the output RVO2 from the downstream O2 sensor 14R (A manner of calculation thereof will be described hereinbelow). Further, the coefficient KP assumes a value set at the aforementioned step S802, S804, or S805.

Then, the steps S926, S927 and S918 are sequentially carried out, followed by terminating the present program. Thus, the timing of generation of the integral term I and the proportional term PR or PL of the correction coefficient KO2 is calculated based on the output FVO2 from the upstream O2 sensor 14F. Further, in FIG. 10A, when the air-fuel ratio feedback control is started, the average value KREF is set as an initial value of the correction coefficient KO2 at the step S902, and then the program proceeds to the step S903. Since the answer to the question of the step S903 is affirmative (YES) in this case, the program proceeds therefrom to the steps S912 to S921 to calculate the correction coefficient KO2, followed by terminating the program.

Figure 11:
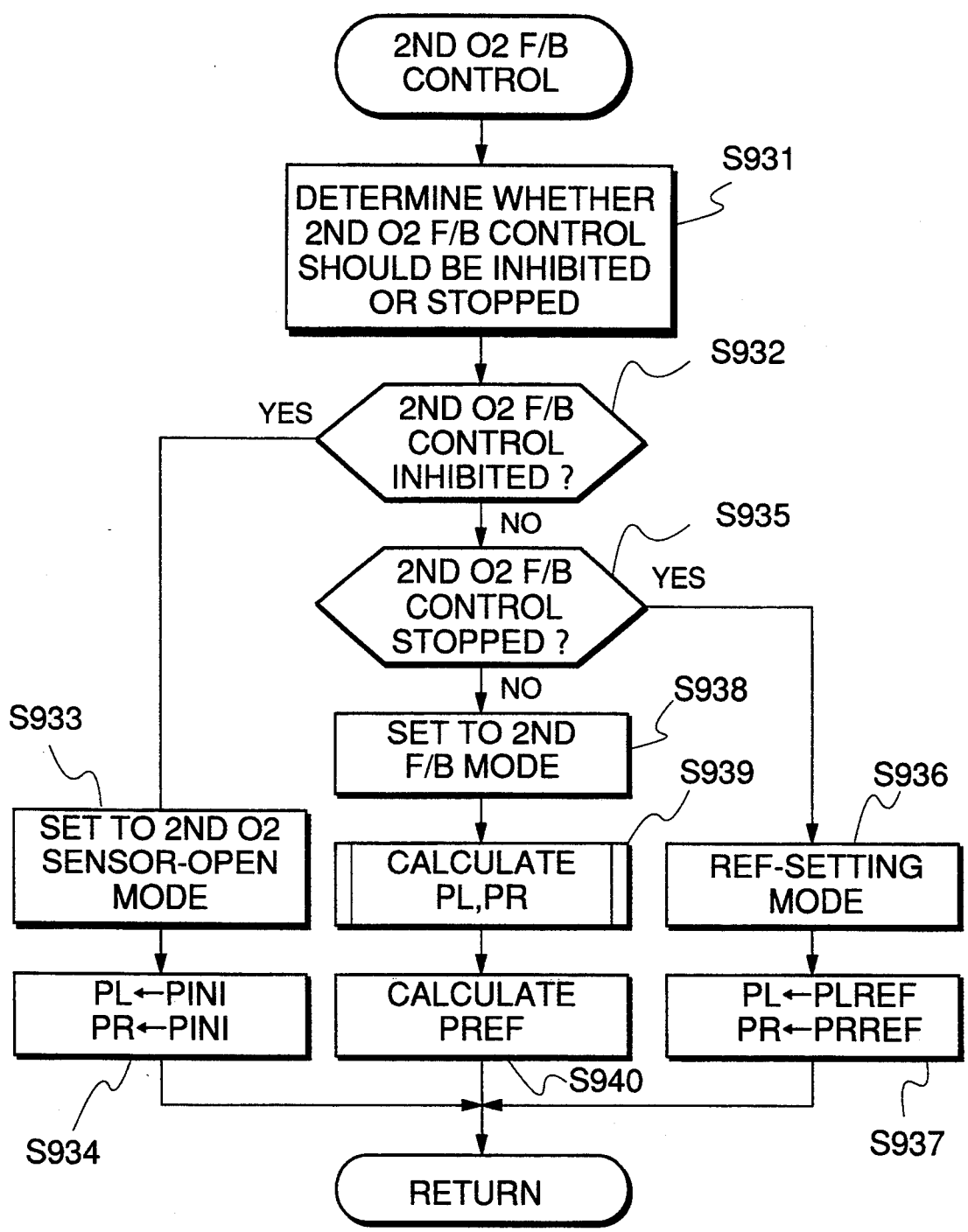
FIG. 11 is a flowchart showing a main routine for executing the air-fuel ratio feedback control based on an output from a downstream O2 sensor.

FIG. 11 shows a main routine for carrying out the air-fuel ratio feedback control based on the output from the downstream O2 sensor 14R, which is executed at time intervals of 100 msec. This program is for correcting a deviation in the control amount (KO2) based on the the output FVO2 from the upstream O2 sensor 14F, by the use of the output RVO2 from the downstream O2 sensor 14R.

First, at a step S931, a feedback control execution-determining processing is carried out for determining whether or not the air-fuel ratio feedback control (hereinafter referred to as "2nd O2 F/B control") based on the output RVO2 from the downstream O2 sensor 14R should be inhibited or stopped temporarily. The 2nd O2 F/B control is inhibited when disconnection/short-circuit of the downstream O2 sensor 14R is detected, or when the air-fuel ratio feedback control based on the upstream O2 sensor 14F is not being executed, or when the engine is idling, etc. The 2nd O2 F/B control is stopped temporarily when the downstream O2 sensor 14R has not been activated, or when the output FVO2 from the upstream O2 sensor 14F is in a transient state, or when a predetermined time period has not elapsed after inhibiting the 2nd O2 F/B control, or when a predetermined time period has not elapsed after temporary stoppage of same.

Then, at a step S932, it is determined whether or not the 2nd O2 F/B control is being inhibited. If the answer to the question is affirmative (YES), the program proceeds to a step S933, where the air-fuel ratio control is set to a downstream O2 sensor-open mode, and then the proportional terms PL and PR are both set to an initial value PINI of the proportional term at a step S934, followed by terminating the program.

If the answer to the question of the step S932 is negative (NO), it is determined at a step S935 whether or not the 2nd O2 F/B control is being temporarily stopped. If the answer to this question is affirmative (YES), the air-fuel ratio control is set to a REF-setting mode at a step S936, and then at a step S937 the proportional terms PL and PR are set to respective learned values PLREF, PRREF calculated by PREF calculation processing, described hereinafter.

If the answer to the question of the step S935 is negative (NO), the air-fuel ratio control is set to a 2nd O2 F/B mode at a step S938, and at a step S939 the proportional terms PL and PR are calculated by a subroutine, described hereinafter. Further, the PREF calculation processing is carried out at a step S940, followed by terminating the program.

FIG. 12A and FIG. 12B show a subroutine executed at the step S939 of the FIG. 11 program for calculating the proportional terms PL, PR. Here, the proportional terms PL, PR are calculated according to variation in the output RVO2 from the downstream O2 sensor 14R.

First, at a step S951, the proportional terms PL and PR are initialized in a manner according to a subroutine, referred to hereinafter, and then, it is determined at a step S952 whether or not a count value CPDLY1 of a counter CPDLY for measuring a delay time in calculating the proportional term is equal to "0". If the answer to this question is negative (NO), the program proceeds to a step S953, where the count value CPDLY is decreased by a decremental value of 1, followed by terminating the program. On the other hand, if the answer to the question of the step S952 is affirmative (YES), the program proceeds to a step S954, where the count value CPDLY is reset to an initial value CPDLYINI thereof.

At the following step S955, it is determined whether or not the output RVO2 from the downstream O2 sensor 14R is lower than a reference value VREFL on the lean side. If the answer to this question is affirmative (YES) (RVO2<VREFL), the program proceeds to a step S956, where a value DPL is added to the immediately preceding value of the proportional term PR to set the resulting value to the present value thereof. Then, at a step S957, it is determined whether or not the proportional term PR is larger than an upper limit value PRMAX.

If the answer to this question is affirmative (YES), i.e. if PR>PRMAX, the upper limit value PRMAX is set to the proportional term PR at a step S958, followed by the program proceeding to a step S959. On the other hand, if the answer to the question of the step S957 is negative (NO), i.e. if PR≦PRMAX, the program skips over the step S958 to the step S959.

At the step S959, the predetermined value DPL is subtracted from the immediately preceding value of the proportional term PL to set the resulting value to the present value thereof, and then at a step S960, it is determined whether or not the present value of the proportional term PL is smaller than a lower limit value PLMIN. If the answer to this question is affirmative (YES), i.e. if PL<PLMIN, the lower limit value PLMIN is set to the proportional term PL at a step S961, followed by terminating the program, if the answer to the question of the step S960 is negative (NO), i.e. if PL≧PLMIN, the step S961 is skipped over, followed by terminating the program.

On the other hand, if the answer to the question of the step S955 is negative (NO) (RVO2≧VREFR), it is determined at a step S962 whether or not the output RVO2 is higher than a reference value VREFR on the rich side. If the answer to this question is affirmative (YES) (RVO2<VREFR), the program proceeds to a step S963, where a predetermined value DPR is subtracted from the immediately preceding value of the proportional term PR to set the resulting means to the present value thereof. Then, at a step S964, it is determined whether or not the resulting proportional term PR is smaller than a lower limit value PRMIN thereof.

If the answer to the question of the step S964 is affirmative (YES), i.e. if PR<PRMIN, the lower limit value PRMIN is set to the proportional term PR at a step S965, and the program proceeds to a step S966. On the other hand, if the answer to the question of the step S964 is negative (NO), i.e. if PR≧PRMIN, the program skips over the step S965 to the step S966.

At the step S966, the value of DPR is added to the immediately preceding value of the proportional term PL to set the resulting value to the present value thereof. Then, it is determined at a step S967 whether or not the resulting proportional term PL is larger than an upper limit value PLMAX thereof. If the answer to this question is affirmative (YES), i.e. if PL>PLMAX, the upper limit value PLMAX is set to the proportional term PL, followed by terminating the program, whereas if the answer is negative (NO), i.e. if PL≦PLMAX, the step S968 is skipped over, followed by terminating the program.

On the other hand, if the answer to the question of the step S962 is negative (NO) (RVO2≦VREFR), it is determined at a step S969 whether or not the output RVO2 from the downstream O2 sensor 14R is lower than a reference value VREF therefor. If the answer to this question is affirmative (YES) (RVO2<VREF), the program proceeds to a step S970, where a predetermined value DPLS is added to the immediately preceding value of the proportional term PR to set the resulting value to the present value thereof. The predetermined value DPLS is set to a smaller value than the predetermined value DPL. Further, at a step S971, it is determined whether or not the resulting proportional term PR is larger than the higher limit value PRMAX.

If the answer to the question of the step S971 is affirmative (YES), i.e. if PR>PRMAX, the higher limit value PRMAX is set to the proportional term PR at a step S972, and then the program proceeds to a step S973. On the other hand, if the answer to the question of the step S971 is negative (NO), i.e. if PR≦PRMAX, the program skips over the step S972 to the step S973.

At the step S973, the present value of the proportional term PL is calculated by subtracting a predetermined value DPLS from the immediately preceding value of the proportional term PL, and then it is determined at a step S974 whether or not the resulting proportional term PL is smaller than the lower limit value PLMIN. If the answer to this question is affirmative (YES), i.e. if PL<PLMIN, the lower limit value PLMIN is set to the proportional term PL at a step S975, followed by terminating the program. If the answer to the question of the step S974 is negative (NO), i.e if PL≧PLMIN, the step S975 is skipped over, followed by terminating the program.

On the other hand, if the answer to the question of the step S969 is negative (NO) (RVO2≧VREFR), the program proceeds to a step S976, where a predetermined value DPRS is subtracted from the immediately preceding value of the proportional term PR to set the resulting value to the present value thereof. The predetermined value DPRS is set to a smaller value than the predetermined value DPR. Further, at a step S977, it is determined whether or not the resulting proportional term PR is smaller than the lower limit value PRMIN. If the answer to this question is affirmative (YES), i.e. if PR<PRMIN, the lower limit value PRMIN is set to the proportional term PR at a step S978, and then the program proceeds to a step S979. If the answer to the question of the step S977 is negative (NO), i.e. if PR≧PRMIN, the program skips over the step S978 to the step S979.

At the step S979, the present value of the proportional term PL is calculated by adding the predetermined value DPRS to the immediately preceding value of the proportional term PL to set the resulting value to the present value thereof, and then it is determined at a step S980 whether or not the resulting proportional term PL is larger than the higher limit value PLMAX. If the answer to this question is affirmative (YES), i.e. if PL>PLMAX, the higher limit value PLMAX is set to the proportional term PL at a step S981, followed by terminating the program. If the answer to the question of the step S980 is negative (NO), i.e if PL≦PLMAX, the step S981 is skipped over, followed by terminating the program.

Thus, according to the present embodiment, if the condition of VREFL≦RVO2≦VREFR is satisfied, the increment and decrement of the proportional terms PR, PL are decreased, whereas if the output RVO2 from the downstream O2 sensor 14R falls outside the above range, the increment and decrement of same are increased, while setting the lower and the upper limit values to the proportional terms PR and PL. Thus, the proportional terms PR and PL are calculated based on the output RVO2 from the downstream O2 sensor 14R to prevent the air-fuel ratio from being disturbed due to an undesirable variation in the upstream O2 sensor 14F.

Figure 13:
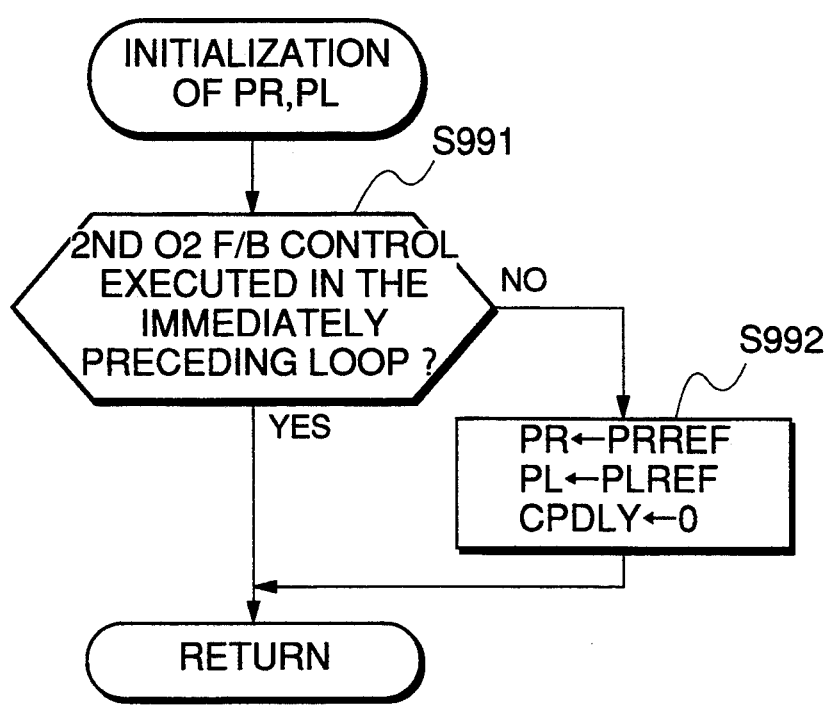
FIG. 13 is a flowchart showing a subroutine for executing initialization of the proportional terms PL, PR at a step S951 in FIG. 12A.

FIG. 13 shows a subroutine executed at the step S951 of the FIG. 12A program for initializing the proportional terms PR and PL.

First, at a step S991, it is determined whether or not the 2nd O2 F/B control was carried out in the immediately preceding loop. If the answer to this question is affirmative (YES), the program is immediately terminated, whereas if the answer is negative (NO), the program proceeds to a step S992, where the proportional terms PL and PR are set to the respective values PLREF and PRREF, and the count value CPDLY is set to "0", followed by terminating the program. The values PLREF, PRREF are average values of the proportional terms PL, PR calculated in the program described hereinabove.

The above described embodiment should not be construed to delimit the scope of the present invention. For example, the abnormality-detecting device according to the present invention may be applied to any kind of abnormality-detecting devices for detecting abnormalities of the engine which detect the abnormalities based on an output from an upstream O2 sensor, insofar as the degree of deterioration of a catalytic converter is detected at least based on an output from a downstream O2 sensor.

What is claimed is:

1. An abnormality-detecting device for an internal combustion engine having an exhaust system, catalytic converter means arranged in said exhaust system, and first and second oxygen concentration-detecting means arranged in said exhaust system at locations upstream and downstream of said catalytic converter means, comprising:
   catalytic converter deterioration-detecting means for detecting a degree of deterioration of said catalytic converter means, based on an output from said second oxygen concentration-detecting means;
   reference value-setting means for setting a reference value for determining an abnormality in said engine, based on the degree of deterioration of said catalytic converter means detected by said catalytic converter deterioration-detecting means;
   abnormality determining means for comparing between said reference value set by said reference value-setting means and a value based on an output from said first oxygen concentration detecting means, and determining the abnormality in said engine, based on a result of said comparison; and
   alarming means for issuing an alarm when said abnormality has been detected by said abnormality determining means.

2. An abnormality-detecting device as claimed in claim 1, wherein said reference value-setting means sets said reference value to a value capable of detecting a lower degree of said abnormality in said engine as the detected degree of deterioration of said catalytic converter means is higher.

3. An abnormality-detecting device as claimed in claim 1, wherein said abnormality determining means determines abnormality of said first oxygen concentration detecting means, based on said result of said comparison between said reference value set by said reference value-setting means and said value based on the output from said first oxygen concentration-detecting means.

4. An abnormality-detecting device as claimed in claim 1, including period detecting means for detecting a repetition period of inversion of the output from said first oxygen concentration-detecting means, and wherein said abnormality determining means compares between said reference value set by said reference value-setting means and the repetition period of inversion detected by said period detecting means, and determines the abnormality of said engine, based on a result of said comparison.

5. An abnormality-detecting device as claimed in claim 3, including correction value-calculating means for calculating a correction value for correcting an air-fuel ratio of a mixture supplied to the engine, based on the output from said first oxygen concentration-detecting means, amplitude detecting means for detecting amplitude of said correction value, and wherein said abnormality determining means compares between said reference value set by said reference value-setting means and the amplitude detected by said amplitude detecting means, and determines an abnormality of said first oxygen concentration-detecting means, based on a result of said comparison.

6. An abnormality-detecting device as claimed in claim 1, wherein said catalytic converter deterioration-detecting means detects the degree of deterioration of said catalytic converter means, based on a response time lag of the output from said second oxygen concentration-detecting means.

7. An abnormality-detecting device as claimed in claim 6, including air-fuel ratio feedback control means for feedback controlling an air-fuel ratio of an air-fuel mixture supplied to said engine, in response to the output from said second oxygen concentration-detecting means, and wherein said response time lag is a time period from the time a predetermined control term is generated during said air-fuel ratio feedback control to the time the output from said second oxygen concentration-detecting means is correspondingly inverted.

8. An abnormality-detecting device as claimed in claim 1, wherein said catalytic converter deterioration-detecting means detects the degree of deterioration of said catalytic converter means, based on a repetition period of inversion of the output from said second oxygen concentration-detecting means.

* * * * *